United States Patent
Lin et al.

(10) Patent No.: US 8,874,505 B2
(45) Date of Patent: Oct. 28, 2014

(54) DATA REPLICATION AND FAILURE RECOVERY METHOD FOR DISTRIBUTED KEY-VALUE STORE

(75) Inventors: Wujuan Lin, Singapore (SG); Kenta Shiga, Singapore (SG)

(73) Assignee: Hitachi, Ltd., Tokyo (JP)

( * ) Notice: Subject to any disclaimer, the term of this patent is extended or adjusted under 35 U.S.C. 154(b) by 544 days.

(21) Appl. No.: 13/004,585

(22) Filed: Jan. 11, 2011

(65) Prior Publication Data

US 2012/0179723 A1    Jul. 12, 2012

(51) Int. Cl.
G06F 17/30    (2006.01)
G06F 11/20    (2006.01)
G06F 11/34    (2006.01)

(52) U.S. Cl.
CPC ........ G06F 11/3433 (2013.01); G06F 2201/88 (2013.01); G06F 2201/81 (2013.01); G06F 11/2094 (2013.01)
USPC ............ 707/609; 707/758; 707/770; 707/812

(58) Field of Classification Search
CPC .................... G06F 17/30106; G06F 17/30206; G06F 17/30545; G06F 17/30575; G06F 17/30315; G06F 17/30194; G06F 17/30539
USPC .......... 707/655, 674, 741, 770, 609, 758, 812
See application file for complete search history.

(56) References Cited

U.S. PATENT DOCUMENTS

| | | | |
|---|---|---|---|
| 7,024,414 B2 | 4/2006 | Sah et al. | |
| 7,447,839 B2 | 11/2008 | Uppala | |
| 7,548,928 B1 | 6/2009 | Dean et al. | |
| 7,580,941 B2 | 8/2009 | Narasayya et al. | |
| 8,521,771 B1* | 8/2013 | Sorenson et al. | 707/770 |
| 8,650,156 B1* | 2/2014 | McHugh et al. | 707/638 |
| 2005/0108203 A1* | 5/2005 | Tang et al. | 707/3 |
| 2007/0061544 A1* | 3/2007 | Uppala | 711/173 |
| 2007/0168336 A1* | 7/2007 | Ransil et al. | 707/3 |
| 2007/0282915 A1* | 12/2007 | Vosshall et al. | 707/200 |
| 2008/0033911 A1* | 2/2008 | Raman et al. | 707/2 |
| 2008/0123664 A1* | 5/2008 | Schwan et al. | 370/395.32 |
| 2009/0327364 A1* | 12/2009 | Schwan et al. | 707/204 |
| 2010/0076930 A1* | 3/2010 | Vosshall et al. | 707/638 |
| 2010/0228848 A1* | 9/2010 | Kis | 709/223 |
| 2010/0235335 A1* | 9/2010 | Heman et al. | 707/703 |
| 2011/0016157 A1* | 1/2011 | Bear et al. | 707/804 |
| 2011/0047380 A1* | 2/2011 | Miller | 713/168 |
| 2011/0153650 A1* | 6/2011 | Lee et al. | 707/769 |
| 2011/0289052 A1* | 11/2011 | Rambacher et al. | 707/624 |

(Continued)

OTHER PUBLICATIONS

Ramamurthy et al., "A Case for Fractured Mirrors", Proceedings of the 28th VLDB Conference, Hong Kong China, 2002.

(Continued)

Primary Examiner — Christyann Pulliam
Assistant Examiner — Rezwanul Mahmood
(74) Attorney, Agent, or Firm — Brundidge & Stanger, P.C.

(57) ABSTRACT

A distributed storage system employs a Key-Value Store to dynamically change a table layout scheme based on user access patterns. The system can be used as a basic architecture to construct a distributed Key-Value Store to support both row-oriented and column-oriented table layout schemes, by using DHT (Distributed Hash Table) technology for high scalability.

9 Claims, 26 Drawing Sheets

(56) References Cited

U.S. PATENT DOCUMENTS

2012/0005424 A1* 1/2012 Shi et al. .................. 711/114
2012/0036163 A1* 2/2012 Myers et al. .............. 707/797
2012/0054197 A1* 3/2012 San Martin et al. ........ 707/741
2012/0072744 A1* 3/2012 Jain et al. .................. 713/320

OTHER PUBLICATIONS

Hankins et al., "Data Morphing: An Adaptive, Cache-Conscious Storage Technique", Proceedings of the $29^{th}$ VLDB Conference, Berlin, Germany, 2003.

* cited by examiner

| Layer | Node ID | IP address |
|---|---|---|
| Layer 1 | 10 | 192.168.1.10 |
| Layer 1 | 30 | 192.168.3.30 |
| Layer 1 | 80 | 192.168.8.80 |
| Layer 1 | ... | ... |
| Layer 1 | 120 | 192.168.12.120 |
| Layer 2 | 20 | 192.168.2.20 |
| Layer 2 | 50 | 192.168.5.50 |
| Layer 2 | ... | ... |

0700 — Employee

| Key | Value | | |
|---|---|---|---|
| Name (0710) | Age (0720) | Dept (0730) | Tel (0740) |
| A | 30 | Sales | 1234 |
| B | 40 | HR | 2345 |
| C | 25 | Sales | 3456 |
| D | 28 | IT | 4567 |
| ... | ... | ... | ... |

Figure 7

| Table Name | Layout Scheme | Number of Columns | List of Columns | Read Counter | Write Counter |
|---|---|---|---|---|---|
| Employee | Row-oriented | 4 | Name | 20 | 10 |
| | | | Age | | |
| | | | Dept | | |
| | | | Tel | | |
| Customer | Column-oriented | 6 | Name | 100 | 5 |
| | | | Company | | |
| | | | ... | | |
| ... | ... | ... | ... | ... | ... |

| Table Name | Layout Scheme | Read Counter | Write Counter |
|---|---|---|---|
| Employee | Row-oriented | 20 | 10 |
| Customer | Column-oriented | 0 | 0 |
| ... | ... | ... | ... |

| Table Name | Column Name | Read Counter | Write Counter |
|---|---|---|---|
| Employee | Age | 80 | 5 |
| ... | ... | ... | ... |

| Node ID | IP Address | Workload |
|---|---|---|
| 10 | 192.168.1.10 | 70% |
| 20 | 192.168.2.20 | 60% |
| 30 | 192.168.3.30 | 75% |
| 50 | 192.168.5.50 | 65% |
| 60 | 192.168.6.60 | 70% |
| ... | ... | ... |

DATA REPLICATION AND FAILURE RECOVERY METHOD FOR DISTRIBUTED KEY-VALUE STORE

BACKGROUND ANALYSIS

A Key-Value Store represents a very promising alternative to traditional relational database management systems (RDBMS). Many application systems, such as web-based applications/services (e.g., Amazon's Dynamo, Google's Big Table, and Facebook) which do not require complex SQL queries, use a Key-Value Store to store and access their data. Typically, data in a Key-Value Store are organized in a table structure with rows and columns, where each row represents a key-value pair (one column as the key and the other columns as the value).

User queries submitted to a Key-Value Store may vary significantly. For instance, one query may access all columns in a table (referred to as full-record access), whereas another query may access only a subset of the columns (referred to as partial-record access). Full-record access is typical in OLTP (online transaction processing) applications, such as online shopping and online gaming, where insert and update operations require the entire record to be read or written. Partial-record access is typical in OLAP (online analysis processing) applications, such as data mining and other business intelligence tools, where only a few attributes (columns) of a table are required, even if the table consists of many attributes. Accordingly, two types of table layout schemes, i.e., a row-oriented layout scheme and a column-oriented layout scheme, can be found in the prior art. In the row-oriented layout scheme, table data are stored row-by-row, where the entire record of a row is stored contiguously. In the column-oriented layout scheme, table data are stored column-by-column, where attribute values belonging to the same column are stored contiguously. It should be noted that the row-oriented layout scheme is optimized for full-record access (to add/modify a record requires single access), but might access unnecessary data for a query which requests only a subset of the columns. In contrast, the column-oriented layout scheme is optimized for partial-record access (only relevant data needs to be read), but is inefficient for inserting or deleting a record (a write requires multiple accesses).

Recently, efforts have been made to support both row-oriented and column-oriented layout schemes in one system, such as U.S. Pat. No. 7,024,424 ("Storage of Row-Column Data"), U.S. Pat. No. 7,447,839 ("System for a Distributed Column Chunk Data Store"), and U.S. Pat. No. 7,548,928 ("Data Compression of Large Scale Data Store in Sparse Tables"). However, none of these can dynamically change the table layout scheme according to user access pattern. On the other hand, Fractured Mirrors (see, e.g., "A Case for Fractured Mirrors", VLDB 2002) stores a table in a row-oriented layout scheme in one disk, and mirrors the table in a column-oriented layout scheme in another disk. A full-record access query is served by the table in the row-oriented layout scheme, while a partial-record access query is served by the table in the column-oriented layout scheme. One drawback of Fractured Mirrors is that no matter how the user access pattern changes, both layout schemes coexist and are maintained for a table.

In order to be adaptive to user access pattern, Fine-Grained Hybrid designs, such as Data Morphing (see, e.g., "Data Morphing: An Adaptive, Cache-Conscious Storage Technique", VLDB, 2003) and U.S. Pat. No. 7,580,941 ("Automated Logical Database Design Tuning"), were proposed to store a table in a row-oriented layout scheme in a disk, and to dynamically reorganize the table data, based on user query, into a column-oriented layout scheme in RAM.

The Fine-Grained Hybrid design is limited to one storage node. Extension of this design to a distributed storage system, in cooperation with data replication and failure recovery, is unknown and nontrivial. However, to accommodate exponentially growing data, it is valuable for a key-value store to be able to scale to multiple storage nodes and distribute the table data for better performance.

SUMMARY

Preferred embodiments of this invention include a method of constructing a distributed Key-Value Store that can dynamically change the table layout scheme based on user access pattern, and a method of recovering node failure in a distributed storage system.

Storage nodes are organized into a two-layer DHT (Distributed Hash Table) overlay. Each DHT layer forms a logical ring ID space in which the smallest ID succeeds the largest ID. Tables at the Layer 2 DHT overlay (hereinafter sometimes referred to as "Layer 2") are stored in a row-oriented layout scheme and distributed based on the hash value of a row key. Tables at the Layer 1 DHT overlay (hereinafter sometimes referred to as "Layer 1") are stored in a column-oriented layout scheme and distributed based on column name.

A table is first created and distributed at the Layer 2 DHT overlay. For redundancy purposes, a storage node, which manages one or more table rows, creates at least one replication of the table data to its next node. Further, each table has a responsible node (the "table responsible node") at Layer 2 whose Node ID is numerically closest clockwise in the ID space to the hash value of the table name. Storage nodes which manage one or more table rows periodically update user access history information, such as read count and write count, to the table responsible node. The table responsible node analyzes user access patterns from the consolidated user access history information, and determines whether a column-oriented table layout scheme is required.

If a column-oriented table layout scheme is required, the table responsible node will inform the storage nodes at Layer 2, which manage one or more table rows, to migrate the replicas in their succeeding nodes from Layer 2 to Layer 1. After migration, the storage nodes at Layer 1, which manage one or more table columns, periodically update user access history information to the table responsible node. Similarly, the table responsible node analyzes user access patterns from the consolidated user access history information. If a row-oriented table layout scheme is required, the table responsible node will inform the storage nodes at Layer 2, which manage one or more table rows, to create replicas to their succeeding nodes. After replication, the table responsible node will inform the storage nodes at Layer 1 to remove the table columns.

If a storage node at Layer 1, which manages a table column, fails, the next storage node at Layer 1 will detect the failure and inform the table responsible node at Layer 2. Thereafter, the table responsible node will request the storage nodes at Layer 2, which manage one or more table rows, to repair the table column. If a storage node at Layer 2, which manages a table row, fails, the next storage node at Layer 2 will detect the failure and inform the table responsible node. If the table has replication at Layer 2, the table responsible node will request the next storage node succeeding the failure node to repair the table row. On the other hand, if the table has replication at Layer 1, the table responsible node will request the storage nodes at Layer 1, which manage one or more table columns, to repair the table row.

To access the table data, a read query is sent to both layers in parallel. If the table has replication in Layer 1, the requested table columns will be served by Layer 1 storage nodes. Otherwise, the request table data will be served by Layer 2 storage nodes. On the other hand, a write query is sent to Layer 2 first to update the table data at Layer 2. If the table has replication in Layer 1, the request will be forward to Layer 1 to update the replication.

Further aspects and advantages of the invention will become apparent by reference to the drawings and detailed description that follow.

BRIEF DESCRIPTION OF THE DRAWINGS

FIG. 6 shows an example of a DHT routing table maintained in a KVS-Node.

FIG. 7 shows an example of a user-created table with "Employee" as the table name.

DETAILED DESCRIPTION OF PREFERRED EMBODIMENTS

Embodiment 1

Figure 1:
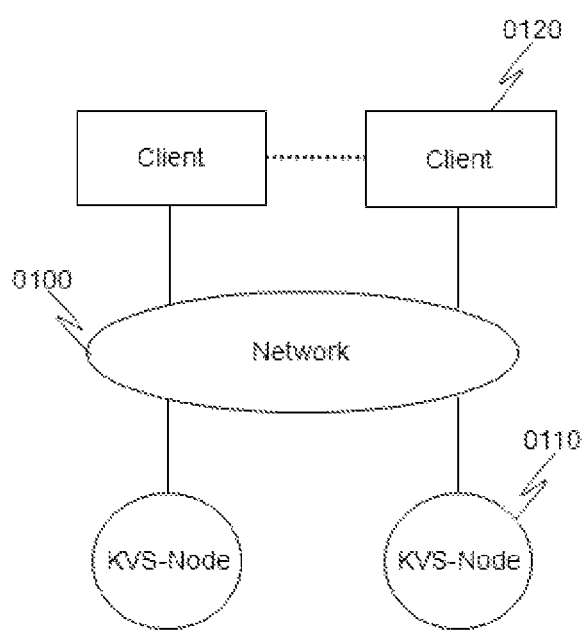
FIG. 1 is an exemplary diagram of a distributed storage system.

FIG. 1 is an exemplary diagram of a distributed storage system according to the present invention. The system consists of multiple KVS-Nodes 0110 and Clients 0120 connected to a network 0100 (such as a local/wide area network). KVS-Nodes 0110 are storage nodes where the Key-Value data are stored. Clients 0120 are devices (such as PCs) that access the Key-Value data stored in the KVS-Nodes.

Figure 2:
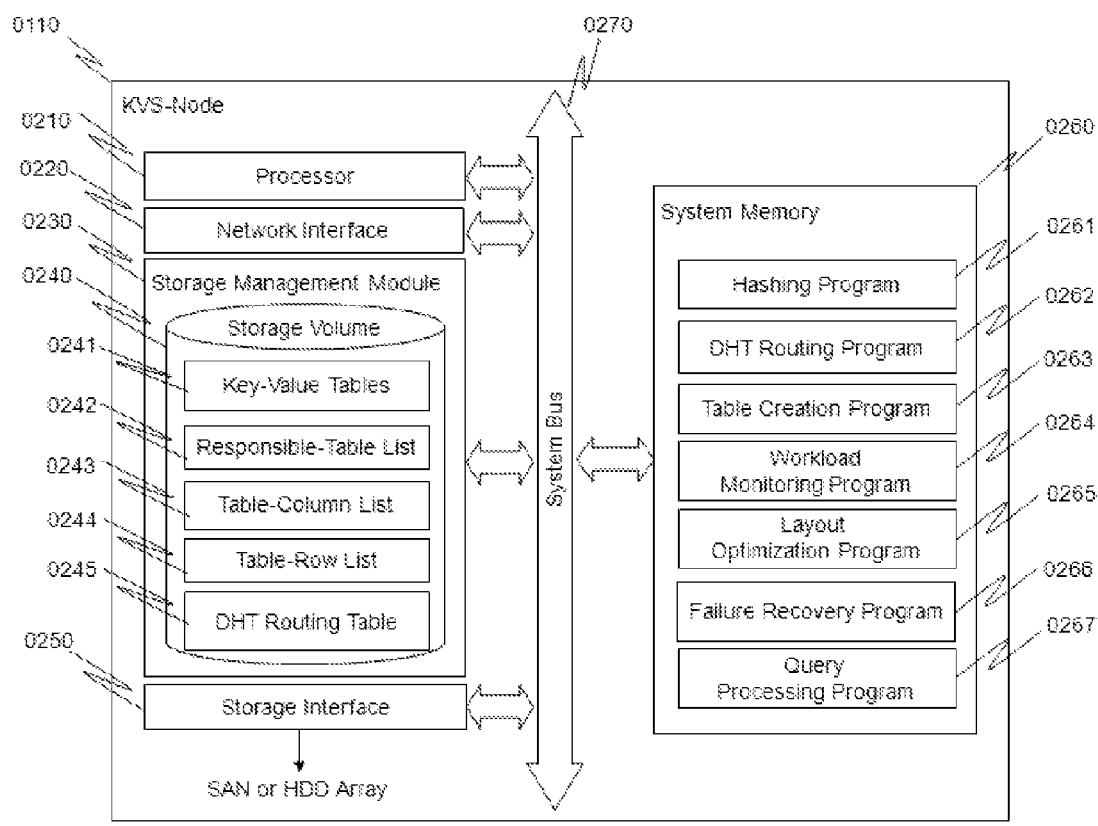
FIG. 2 is a block diagram illustrating the components within a KVS-Node.

FIG. 2 is a block diagram illustrating components within an example of a KVS-Node 0110. A KVS-Node may consist of, but is not limited to, a processor 0210, a network interface 0220, a storage management module 0230, a storage interface 0250, a system memory 0260, and a system bus 0270. The system memory 0260 may include a hashing program 0261, a DHT (Distributed Hash Table) routing program 0262, a table creation program 0263, a workload monitoring program 0264, a layout optimization program 0265, a failure recovery program 0266, and a query processing program 0267, which are computer programs executed by the processor 0210. The storage interface 0250 manages storage, such as the storage of a storage area network (SAN) or an internal hard disk drive (HDD) array, for example, and provides raw data storage to the storage management module 0230. The storage management module 0230 organizes the raw data storage into a storage volume 0240, where user and system data are stored, including (but not limited to) one or more Key-Value tables 0241, a responsible-table list 0242, a table-column list 0243, a table-row list 0244, and a DHT routing table 0245. The network interface 0220 connects the KVS-Node 0110 to the network 0100 and is used for communication with other KVS-Nodes 0110 and Clients 0120. The processor 0210 represents a central processing unit that executes the computer programs. Commands and data communicated among the processor and other components are transferred via the system bus 0270.

Figures 3, 4:
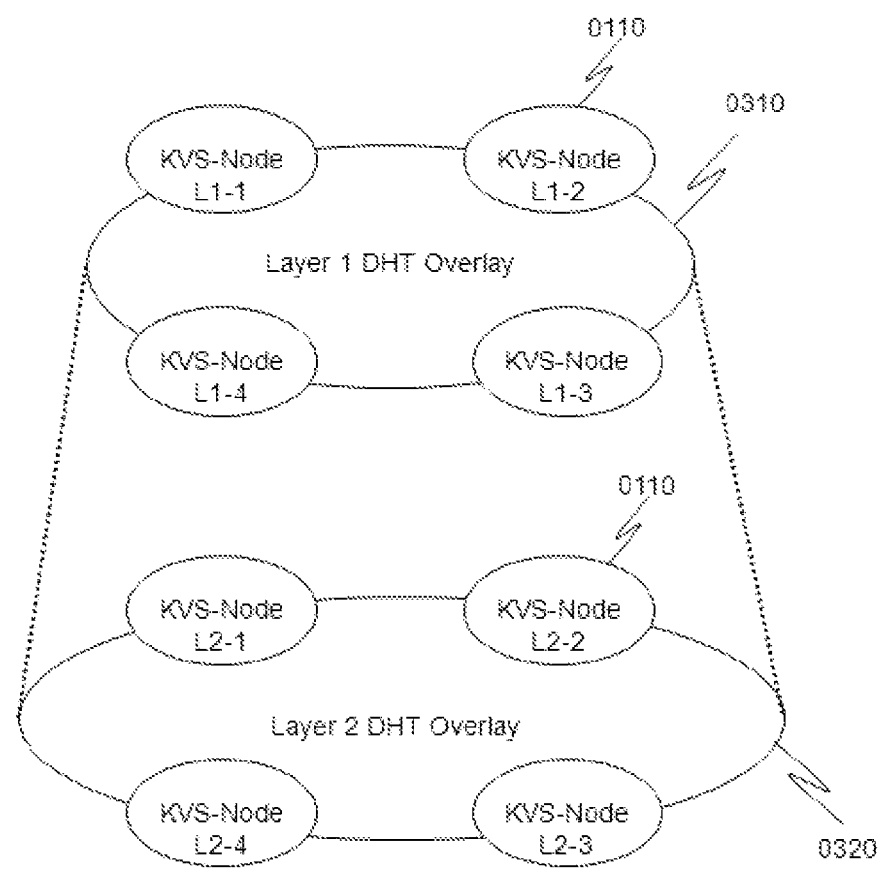
FIG. 3 schematically illustrates a high level overview of a logical architecture of KVS-Nodes.
FIG. 4 is a table that shows an example of mapping an IP address to a Node ID by calculating the hash value of the IP address.

FIG. 3 schematically illustrates a high level overview of a logical architecture of the KVS-Nodes 0110, where the KVS-Nodes 0110 are organized into two layers: a Layer 1 DHT Overlay 0310 (including KVS-Nodes L1-1 through L1-4) and a Layer 2 DHT Overlay 0320 (including KVS-Nodes L2-1 through L2-4). Each DHT overlay (0310 or 0320) manages an ID space, organized into a logical ring where the smallest ID succeeds the largest ID. Data and KVS-Nodes 0110 are hashed to the same ID space. A hash value is assigned to a responsible KVS-Node 0110 whose Node ID is numerically closest clockwise in the ID space to the hash value.

A KVS-Node 0110 obtains its Node ID by executing the hashing program 0261 to calculate the hash value of its IP address. With a collision-free hash function, such as 160-bit SHA-1 or the like, the Node ID assigned to a KVS-Node 0110 will be globally unique. FIG. 4 is a table that shows an example of mapping an IP address 0410 to a Node ID 0430, by calculating the hash value 0420 of the IP address. In this example, an 8-bit ID space [0-127] is illustrated. It should be noted that in this description, a decimal ID space, instead of binary bits, is used to represent the Node ID for simplicity of explanation. As in the example, the hash value of a KVS-Node's IP address, 192.168.1.10, is 10, and therefore, the Node ID of the KVS-Node is assigned as 10.

Figure 5:
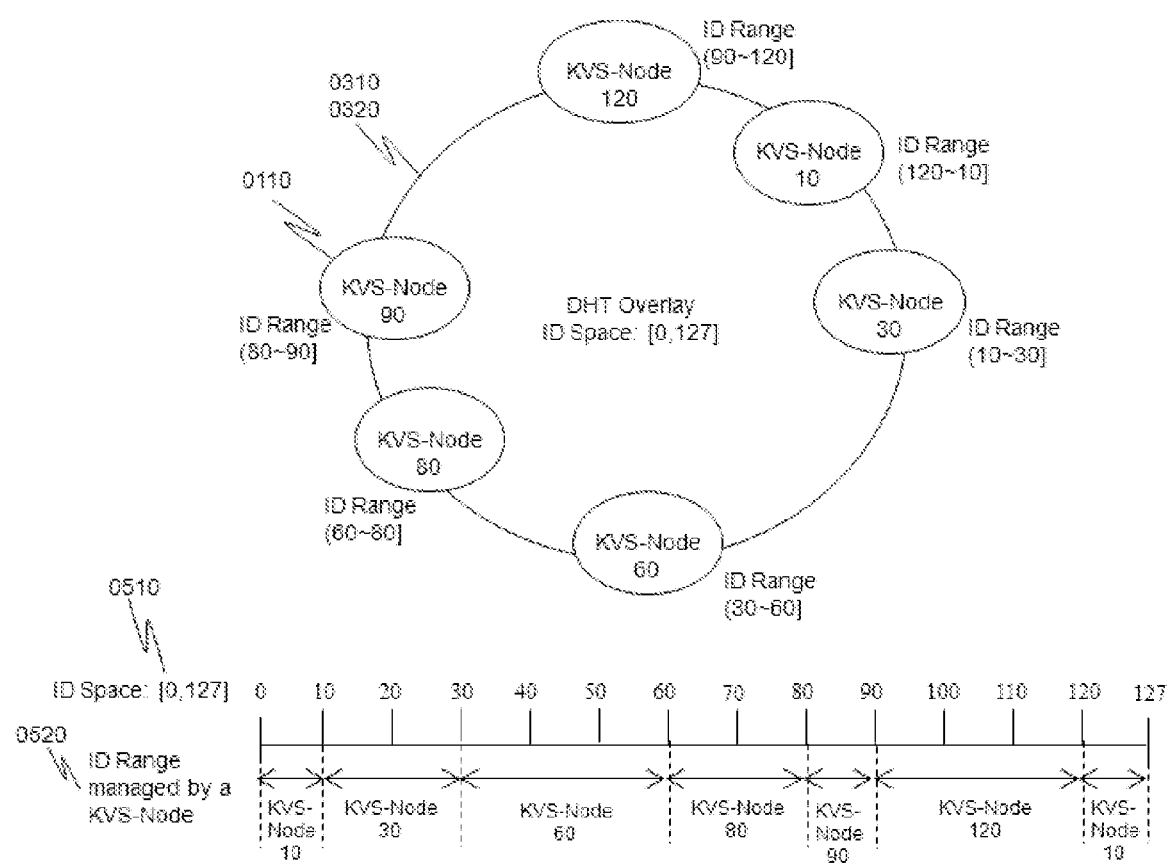
FIG. 5 shows an ID range managed by each KVS-Node in a DHT overlay with ID space [0,127].

Each KVS-Node 0110 in a DHT overlay (0310 or 0320) is responsible for a range of ID space that has no overlap with the ID ranges managed by other KVS-Nodes 0110 in the same DHT overlay. FIG. 5 shows an ID range 0520 managed by each KVS-Node 0110 in a DHT overlay with ID space 0510 [0,127]. It should be noted that the ID space 0510 forms a circle, and therefore the ID range 0520 managed by the KVS-Node 0110 with Node ID 120 is (90~120], the ID range managed by the KVS-Node with Node ID 10 is (12~10], and the ID range managed by the KVS-Node with Node ID 30 is (10~30], and so on.

Each KVS-Node maintains a DHT routing table 0245, which stores information of other KVS-Nodes 0110 known by the current KVS-Node, in both DHT overlays (0310 and 0320). Each KVS-Node executes a DHT routing program 0262, which uses and updates the information in the DHT routing table 0245, to cooperatively form the DHT overlays (0310 and 0320). The DHT routing program 0262 can be any DHT-based routing program, including existing routing programs, which supports 2 layer DHT overlay (such as "Hierarchical Peer-to-Peer Systems", 2003).

FIG. 6 shows an example of a DHT routing table 0245 maintained in a KVS-Node 0110 which, in this example, is the KVS-Node with Node ID 10 in Layer 1. A DHT routing table 0245 may consist of, but is not limited to, three columns, including Layer 0610, Node ID 0620, and IP address 0630. Layer 0610 is either "Layer 1" or "Layer 2". An entry of "Layer 1" means that the KVS-Node 0110 having the corresponding Node ID 0620 and IP address 0630 in the same table row is in the Layer 1 DHT overlay 0310. Similarly, "Layer 2" means that the KVS-Node 0110 having the Node ID 0620 and IP address 0630 in the same table row is in the Layer 2 DHT overlay 0320. It should be noted that a KVS-Node maintains at least two KVS-Nodes (its predecessor and successor) in the same DHT overlay to which it belongs, and at least one KVS-Node in the other DHT overlay. The predecessor of a KVS-Node 0110 in a DHT overlay (either 0310 or 0320) is the KVS-Node whose Node ID is numerically closet counterclockwise in the ID space. The successor of a KVS-Node 0110 in a DHT overlay (either 0310 or 0320) is the KVS-Node whose Node ID is numerically closet clockwise in the ID space. In this example, the predecessor node for KVS-Node 0110 with Node ID 10 in Layer 1 is the KVS-Node with Node ID 120, and its successor is the KVS-Node with Node ID 30.

Key-Value data created by users are organized in a logical table structure with rows and columns, where each row represents a key-value pair (one column as the key and the other columns as the value). FIG. 7 shows an example of a user-created table 0700 with "Employee" as the table name. Table Employee 0700 consists of four columns, including Name 0710, Age 0720, Dept (department) 0730, and Tel (telephone number) 0740. At each row entry, the name 0710 is the key, and the rest (age 0720, dept 0730, and tel 0740) are the value. For example, Employee A is aged 30, belongs to Dept "Sales", and has telephone number 1234.

Figure 8:
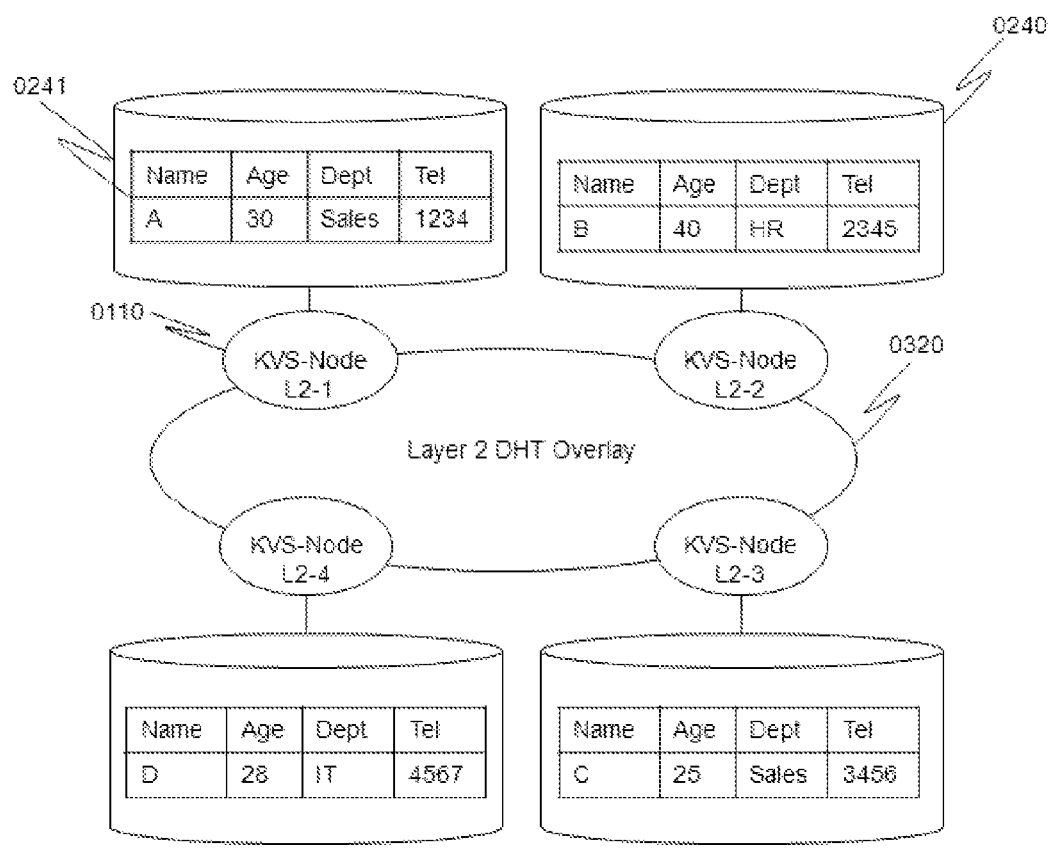
FIG. 8 shows an example illustrating table data of table Employee (FIG. 7) distributed in the Layer 2 DHT overlay and stored with a row-oriented layout scheme.
Figure 9:
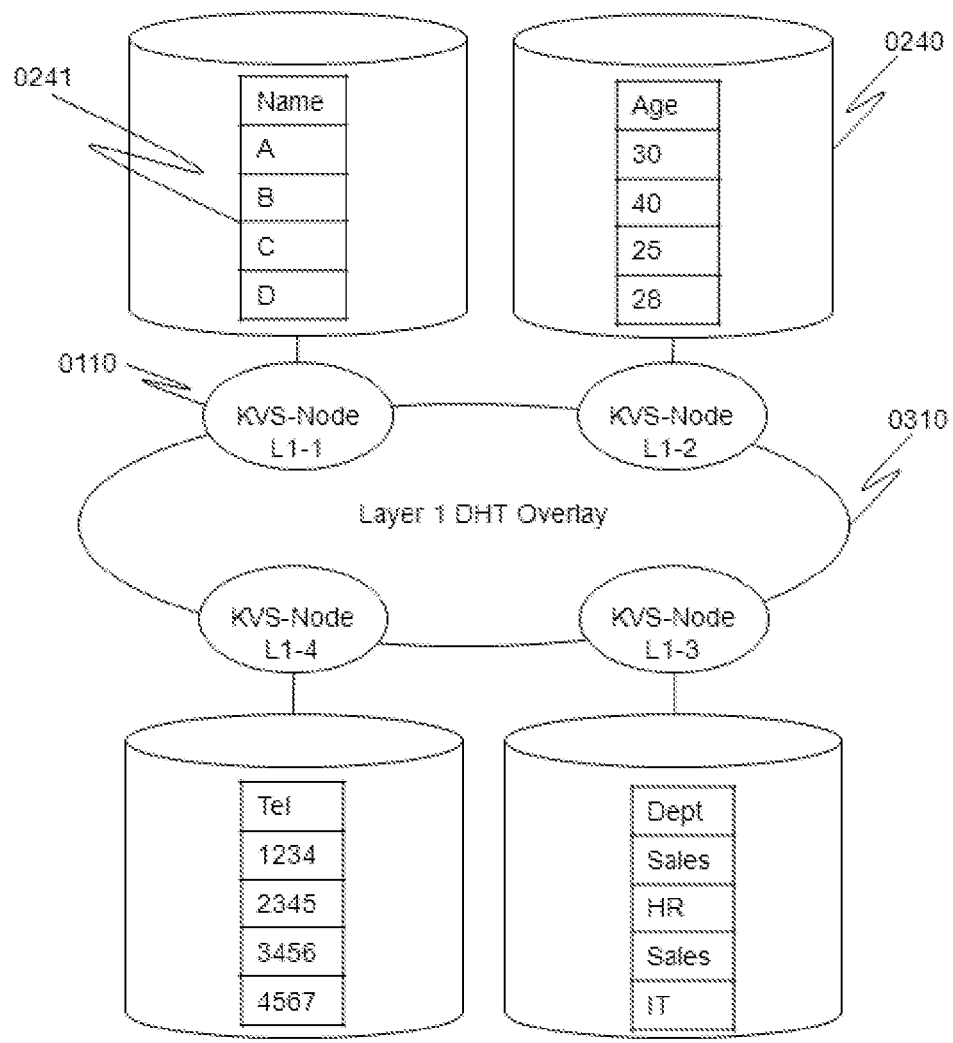
FIG. 9 shows an example illustrating table data of table Employee (FIG. 7) distributed in the Layer 1 DHT overlay and stored with a column-oriented layout scheme.

Table data are distributed to the KVS-Nodes 0110 and stored therein in Key-Value tables 0241. More specifically, in Layer 2, table data are distributed to KVS-Nodes 0110 based on the hash values of row keys, and stored with a row-oriented layout scheme, where the entire record of a row is stored contiguously. FIG. 8 shows an example, illustrating table data of table Employee 0700 distributed in Layer 2 and stored with a row-oriented layout scheme. On the other hand, in Layer 1, table data are distributed to KVS-Nodes 0110 based on the hash values of column names, and stored with a column-oriented layout scheme, where attribute values belonging to the same column are stored contiguously. FIG. 9 shows an example illustrating table data of table Employee 0700 distributed in Layer 1 and stored with a column-oriented layout scheme.

Figure 10:
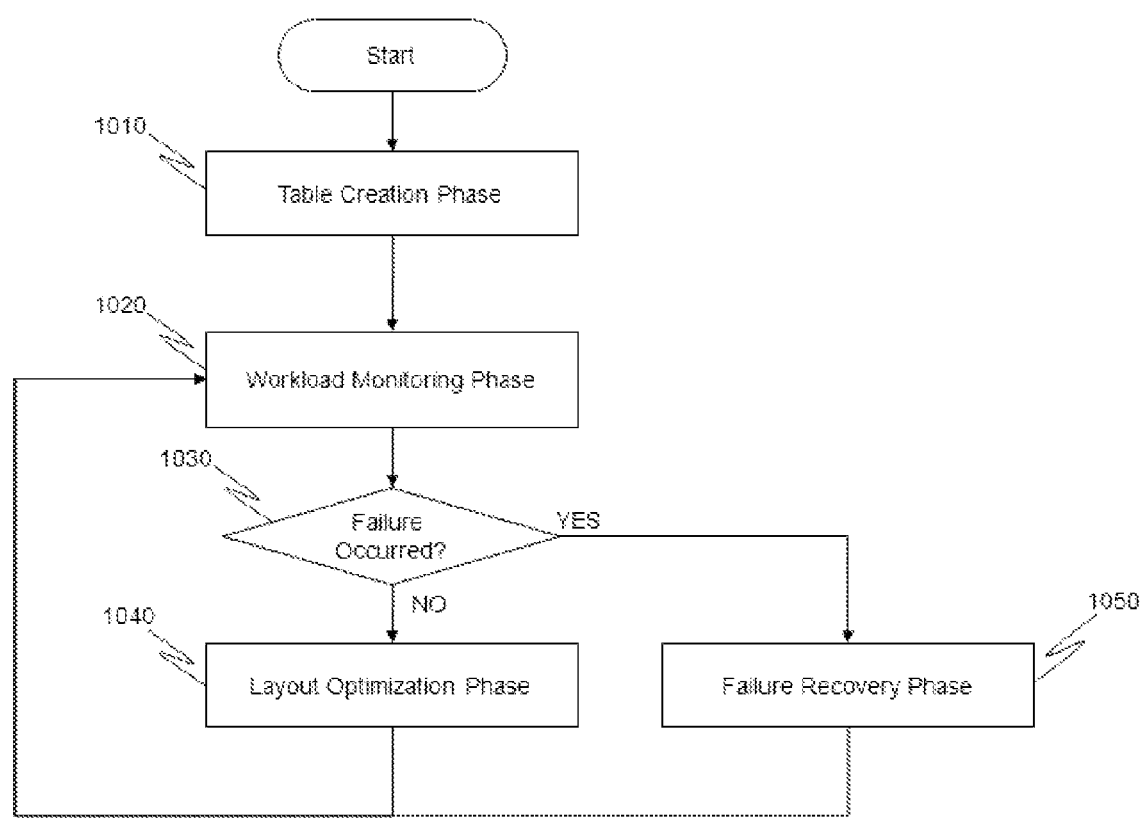
FIG. 10 is a flow diagram illustrating exemplary steps for creating table information and storing table data, monitoring workload, optimizing the table layout scheme, and recovering table data in the case of failure.

FIG. 10 is a flow diagram illustrating exemplary steps for creating table information and storing table data, monitoring workload, optimizing the table layout scheme, and recovering table data if failure occurs. In Step 1010 (Table Creation Phase), a KVS-Node 0110 (in either Layer 1 or Layer 2) creates table information and distributes table data in Layer 2. The KVS-Nodes 0110 in both Layer 1 and Layer 2 then cooperatively perform Step 1020 (Workload Monitoring Phase) to monitor the user access workload and, as long as no failure occurs (Step 1030), Step 1040 (Layout Optimization Phase) to optimize the table layout scheme based on the workload information. Then, Step 1020 and Step 1040 are repeated under the same condition until the occurrence of a failure is determined in Step 1030, at which Step 1050 (Failure Recovery Phase) is performed and the KVS-Nodes 0110 will cooperatively recover the table data. These steps will be further described hereafter. The mechanism to detect a failure in Step 1030 can be heartbeat communication or any other failure detection method existed in the prior arts.

Figures 11, 12:
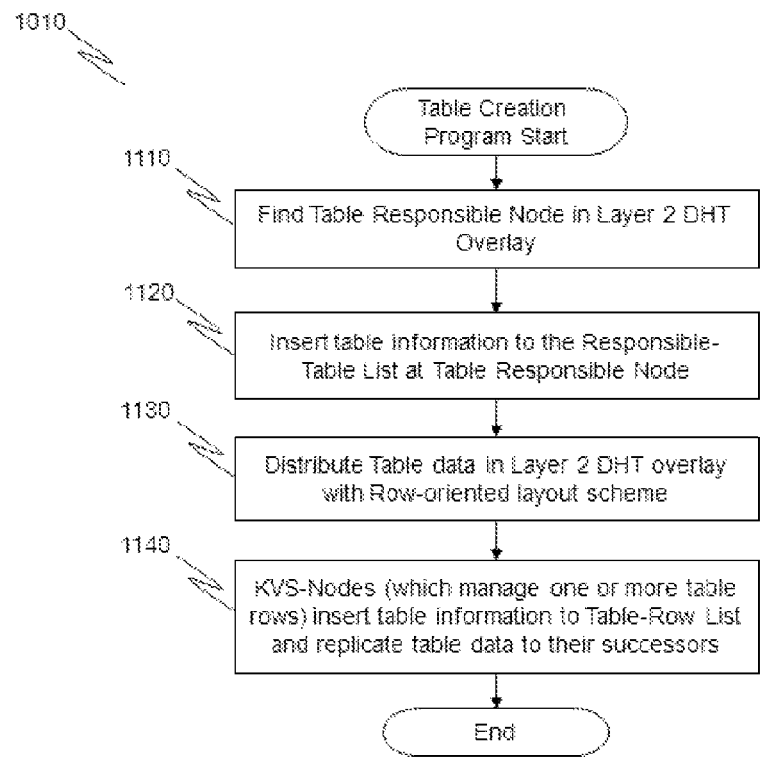
FIG. 11 is a flow diagram of an example of the Table Creation Phase (Step 1010).
FIG. 12 shows an example of the structure of a responsible-table list.

FIG. 11 is a flow diagram of an example of the Table Creation Phase (Step 1010). A KVS-Node 0110 executes the table creation program 0263 during the Table Creation Phase. In Step 1110, by executing the DHT routing program 0262, the KVS-Node 0110 finds another KVS-Node 0110 (the table responsible node) whose Node ID is numerically closest clockwise in the ID space of Layer 2 DHT overlay 0320 to the hash value of the table name. In Step 1120, the KVS-Node 0110 inserts the table information to the responsible-table list 0242 at the table responsible node.

FIG. 12 shows an example of the structure of responsible-table list 0242. A responsible-table list 0242 consists of, but is not limited to, six columns, including table name 1210, layout scheme 1220, number of columns 1230, list of columns 1240, read counter 1250, and write counter 1260. The layout scheme 1220 is either "Row-oriented" or "Column-oriented". Initially, the layout scheme 1220 is set to "Row-oriented". The number of columns 1230 and list of columns 1240 represent the table structure. The read counter 1250 and write counter 1260 record the user access workload information, in terms of number of read queries (e.g., search) and write queries (e.g., insert, update, delete), respectively. Both the read counter and the write counter are initially set to 0, and will be updated during the Workload Monitoring Phase 1020.

Referring back to FIG. 11, in Step 1130, the KVS-Node 0110 distributes the table data in Layer 2, with a row-oriented layout scheme based on the hash value of each row key. Then, in Step 1140, all KVS-Nodes 0110, which manage one or more table rows, insert table information into a table-row list 0244, and replicate the table data to their successors for redundancy.

It should be noted that different KVS-Nodes may have different performances, in terms of CPU power, disk I/O, network bandwidth, or a combination thereof. Existing load balancing techniques for DHT-based P2P systems (such as "Load Balancing in Structured P2P Systems", 2003, and "Using Global Information for Load Balancing in DHTs", 2008) can be incorporated with this invention, so that a KVS-Node can manage different amounts of table data and become a table responsible node for different numbers of tables, based on performance.

Figures 13, 14:
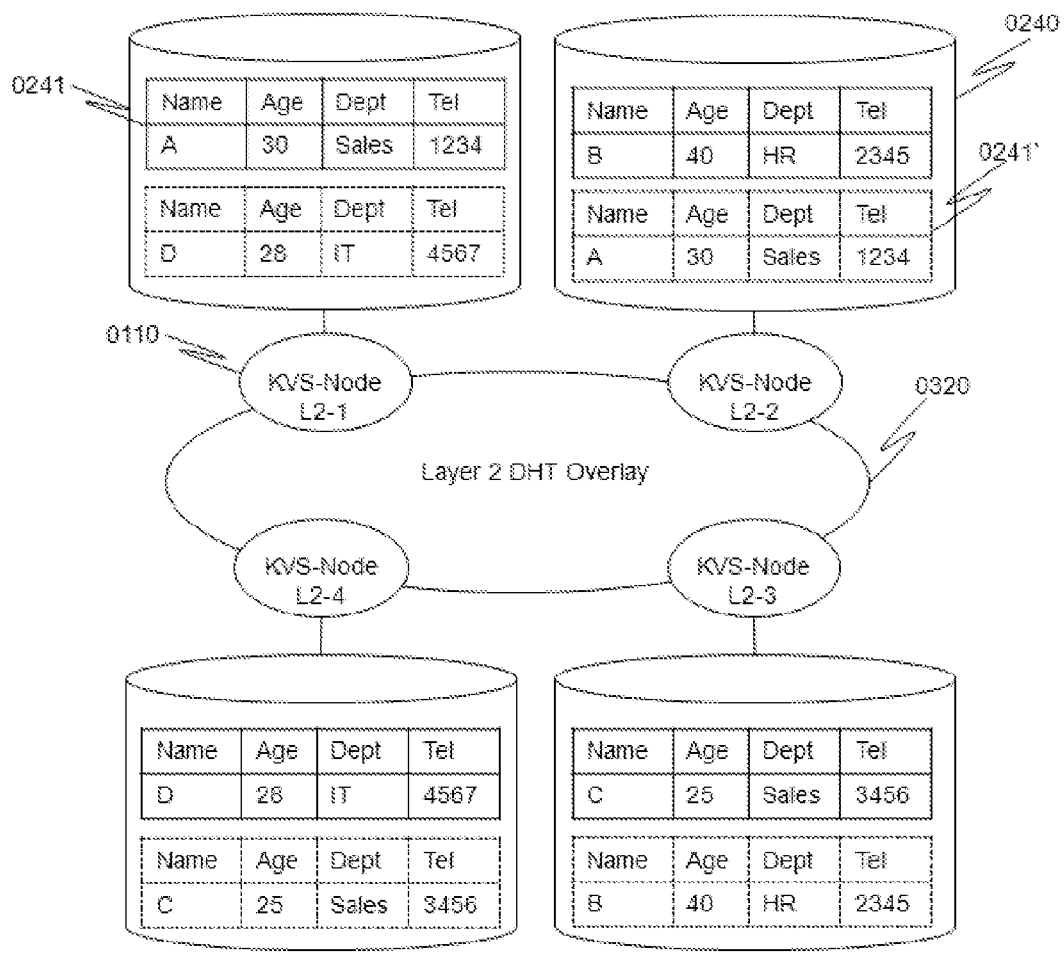
FIG. 13 shows an example of the structure of a table-row list.
FIG. 14 shows an example illustrating table data of "Employee" (FIG. 7) distributed in the Layer 2 DHT overlay and stored with a row-oriented layout scheme.

FIG. 13 shows an example of the structure of table-row list 0244. A table-row list 0244 consists of, but is not limited to, four columns, including table name 1310, layout scheme 1320, read counter 1330, and write counter 1340. Similarly to the responsible-table list 0242, the layout scheme 1320 is either "Row-oriented" or "Column-oriented". Initially, the layout scheme 1320 is set to "Row-oriented". The read counter 1330 and write counter 1340 record the user access workload information, in terms of number of read queries (e.g., search) and write queries (e.g., insert, update, delete), respectively. The read counter and write counter are initially set to 0, and may be increased by 1 when serving a read query or write query.

FIG. 14 shows an example illustrating table data of table Employee 0700 distributed in Layer 2 and stored with a row-oriented layout scheme. Each of the KVS-Nodes 0110 which manage one or more table rows (in a Key-Value table 0241) replicates the table data to its successor (in its Key-Value table 0241').

Figures 15, 16:
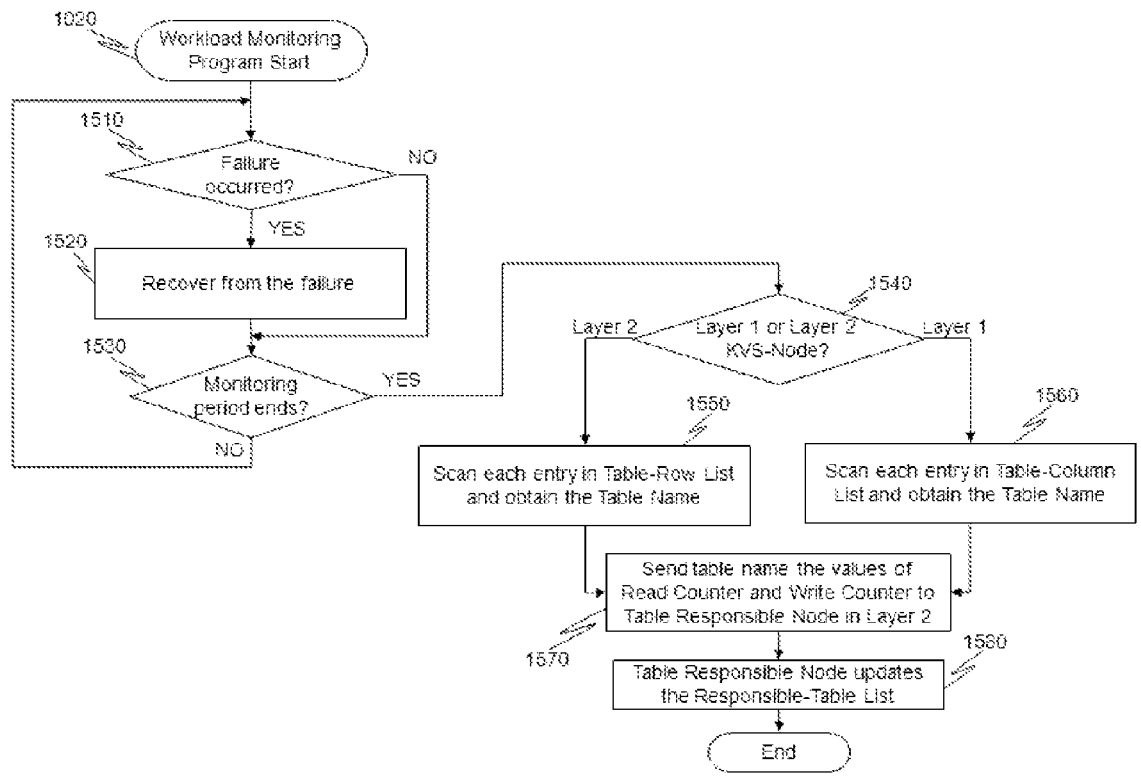
FIG. 15 is an example of a flow diagram of the Workload Monitoring Phase (Step 1020).
FIG. 16 shows an example of the structure of a table-column list.

FIG. 15 is an example of a flow diagram of the Workload Monitoring Phase (Step 1020). The Workload Monitoring Phase is carried out in KVS-Nodes 0110 by executing the workload monitoring program 0264. In Step 1510, a KVS-Node 0110 checks whether a failure has occurred in its predecessor node (the method to detect a failure is the same as that in Step 1030). If YES, the KVS-Node will execute the failure recovery program 0266 to recover from the failure (Step 1520). This is the Failure Recovery Phase (Step 1050), which will be further explained with respect to FIG. 21. If it is determined in Step 1510 that no failure has occurred in the predecessor node, the KVS-Node checks whether the predefined monitoring time period ends (Step 1530). If NO, the KVS-Node will repeat the Step 1510. If Yes in Step 1530, the KVS-Node checks to determine the DHT overlay (0310 or 0320) to which it belongs by checking its DHT routing table 0245 (Step 1540). If the KVS-Node 0110 is in Layer 2, the KVS-Node scans each entry in the table-row list 0244 and obtains the table name 1310 (Step 1550). Otherwise, if the KVS-Node 0110 is in Layer 1, the KVS-Node scans each entry in the table-column list 0243 and obtains the table name 1610 (Step 1560).

FIG. 16 shows an example of the structure of a table-column list 0243. When a table is distributed in Layer 1 with a column-oriented layout scheme, each KVS-Node 0110, which manages one or more table columns, inserts the table information into a table-column list 0243. A table-column list 0243 consists of, but is not limited to, four columns, including table name 1610, column name 1620, read counter 1630, and write counter 1640. Similarly to the table-row list 0244, the read counter 1630 and write counter 1640 are initially set to 0, and may be increased by 1 when serving a read query or write query.

Referring back to FIG. 15, in Step 1570, the KVS-Node 0110 sends the table name and the values of the read counter and write counter, obtained from either table-row list (if the KVS-Node is in Layer 2) or table-column list (if the KVS-Node is in Layer 1), to the table responsible node in Layer 2. Thereafter, in Step 1580, the table responsible node updates the responsible-table list 0242 for the corresponding table entry by increasing the read counter 1250 and write counter 1260 with the received values.

It should be noted that responsible-table list 0242, table-column list 0243, and table-row list 0244 at a KVS-Node 0110 are also replicated to the successor node, for redundancy. All replicated data are synchronized with the primary data copies.

Figure 17:
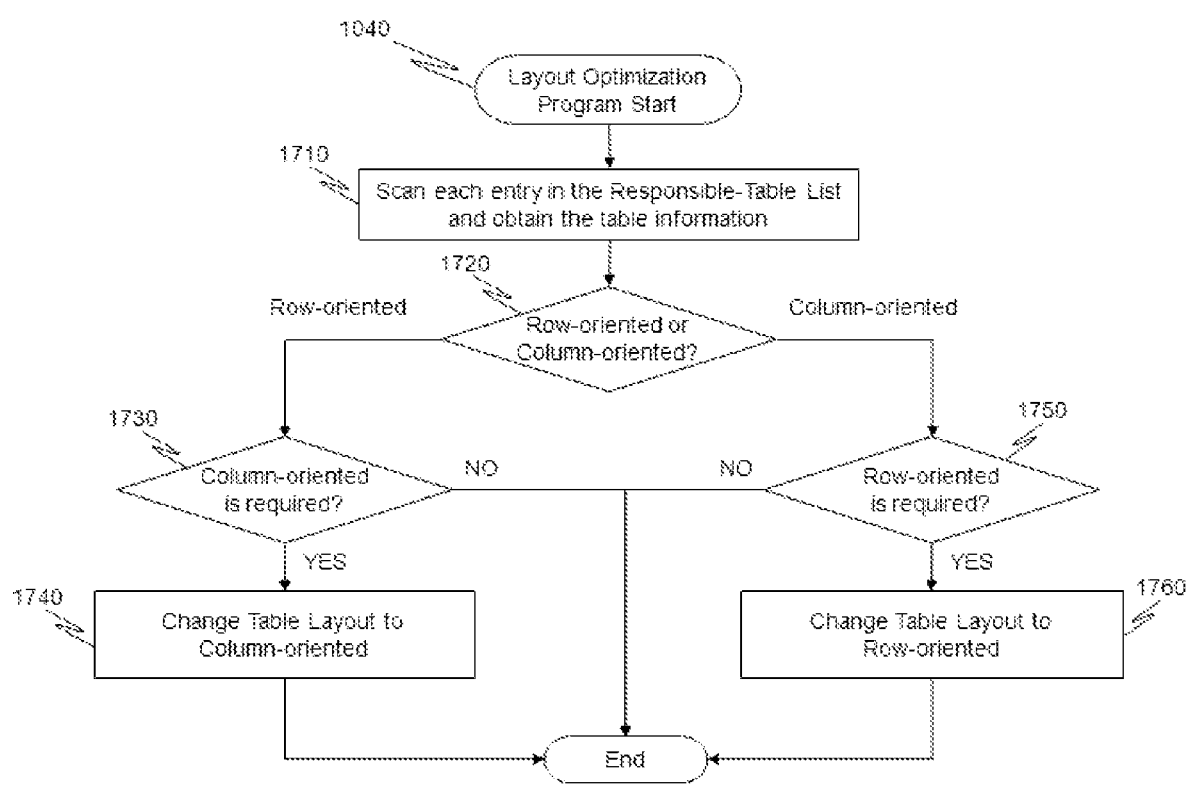
FIG. 17 is an example of a flow diagram of the Layout Optimization Phase (Step 1040).
Figure 18:
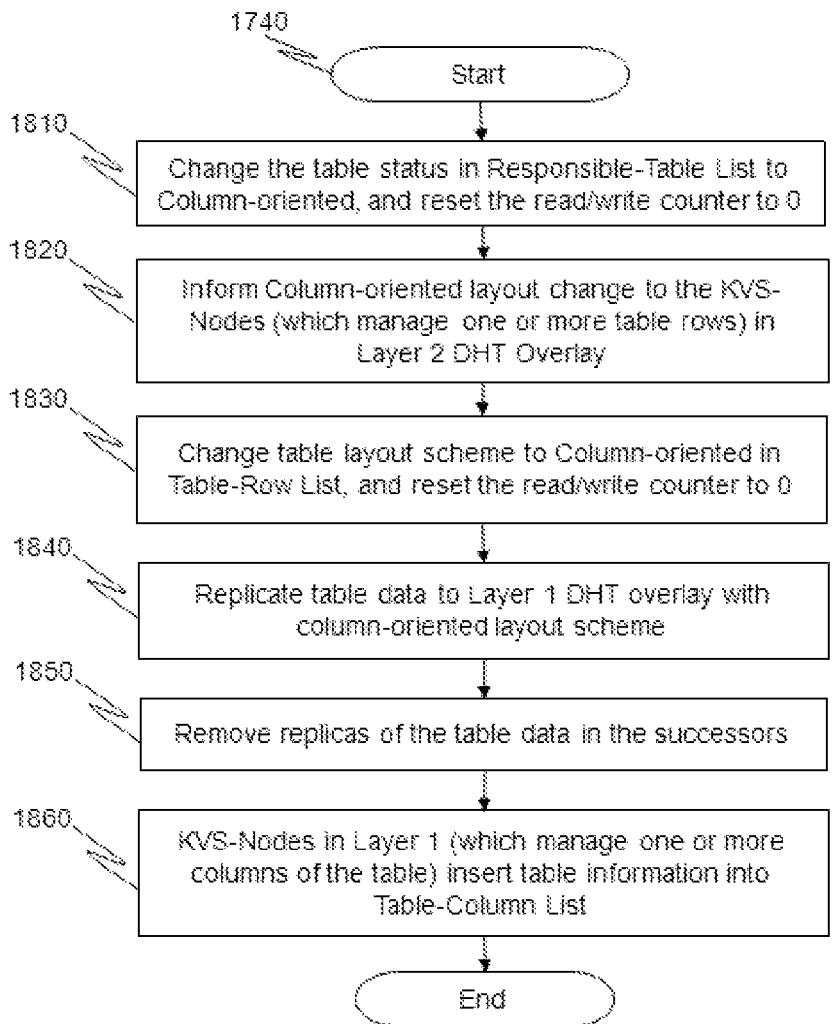
FIG. 18 is a flow diagram illustrating exemplary steps for changing a table layout to column-oriented (Step 1740).

FIG. 17 is an example of a flow diagram of the Layout Optimization Phase (Step 1040). The Layout Optimization Phase is carried out in KVS-Nodes 0110 periodically, which are the table responsible nodes of one or more tables, by executing the layout optimization program 0265. In Step 1710, a KVS-Node 0110 scans each entry in the responsible-table list 0242 and obtains the table information. In Step 1720, the KVS-Node checks whether the current layout scheme 1220 of the particular table entry 1210 is row-oriented or column-oriented. If the current table layout scheme is row-oriented, the KVS-Node checks whether a column-oriented layout scheme is required for the particular table (Step 1730). If YES, the KVS-Node 0110 will change the table layout scheme to column-oriented (Step 1740). The condition to determine whether a column-oriented layout scheme is required (Step 1730) is based on the access pattern to the particular table, such as the ratio between the values of the read counter 1250 and write counter 1260, cache hit ratio, percentage of accessed table columns over total table columns, or a combination of these. For simplicity of explanation, as used herein, the read/write ratio represents the user access pattern, and is used as the condition for layout optimization. More specifically, if the ratio between the values of the read counter 1250 and write counter 1260 is larger than a predefined threshold, Threshold 1, the KVS-Node 0110 will determine that a column-oriented layout scheme is required for the particular table in Step 1730. FIG. 18 is a flow diagram illustrating exemplary steps constituting the Step 1740. In Step 1810, the KVS-Node 0110 (i.e., a table responsible node) changes the table layout scheme 1220 in responsible-table list 0242 to column-oriented, and resets the read and write counters 1250 and 1260 to 0. In Step 1820, the table responsible node informs the corresponding KVS-Nodes 0110 in Layer 2, which manage one or more table rows, of the column-oriented layout scheme change. In Step 1830, when receiving the information from the table responsible node, the corresponding KVS-Nodes change the table information in the table-row list 0244, i.e., change the table layout scheme 1320, to column-oriented, and reset the read and write counters 1330 and 1340 to 0. In Step 1840, the corresponding KVS-Nodes replicate and distribute the table data to Layer 1 in a column-oriented layout scheme, based on the hash value of the column name. Thereafter, in Step 1850, the corresponding KVS-Nodes remove the replicas of the table data in their successor nodes. Lastly, in Step 1860, the KVS-Nodes 0110 in Layer 1, which now manage one or more table columns, insert the table information (read counter 1630 and write counter 1640 are set to 0) into the table-column list 0243.

Figure 19:
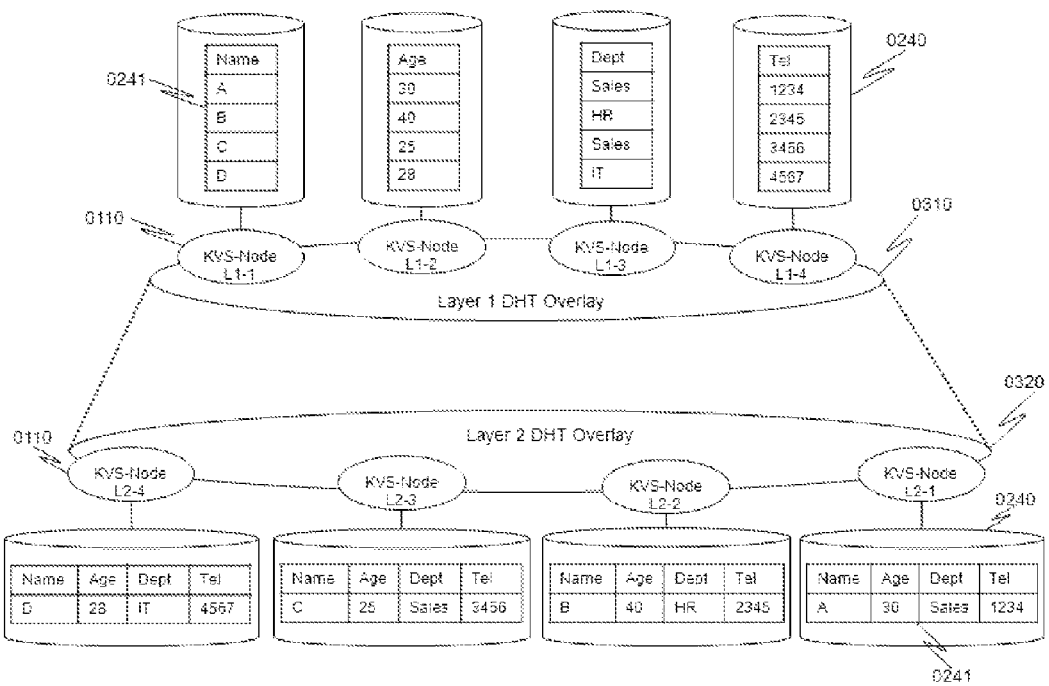
FIG. 19 shows an example illustrating a layout scheme change of table Employee (FIG. 7) after optimization.

FIG. 19 shows an example illustrating the layout scheme change of table Employee 0700 (compare to FIG. 14) after optimization. As shown, the primary copy of table Employee 0700 is distributed in Layer 2 and stored with a row-oriented layout scheme. The replica of the Employee table is distributed in Layer 1 and stored with a column-oriented layout scheme.

Referring back to FIG. 17, if the current table layout scheme is column-oriented in Step 1720, the KVS-Node will then check whether a row-oriented layout scheme is required for the particular table (Step 1750). If YES, the KVS-Node 0110 will change the table layout scheme to row-oriented (Step 1760). Similar to Step 1730, the condition to determine whether a row-oriented layout scheme is required in Step 1750 is based on the access pattern to the particular table. More specifically, if the ratio between the values of the read counter 1250 and write counter 1260 is smaller than a predefined threshold, Threshold 2, the KVS-Node 0110 will determine that a row-oriented layout scheme is required for the particular table in Step 1750. Furthermore, it should be noted that the values of Threshold 1 (used in Step 1730) and Threshold 2 (used in Step 1750) can be determined based on the table data size and system resources, such as CPU, disk I/O, network bandwidth, or a combination of these. Typically, the value of Threshold 1 should be larger than the value of Threshold 2 to avoid frequent layout scheme changes which consume system resources for data migration.

Figure 20:
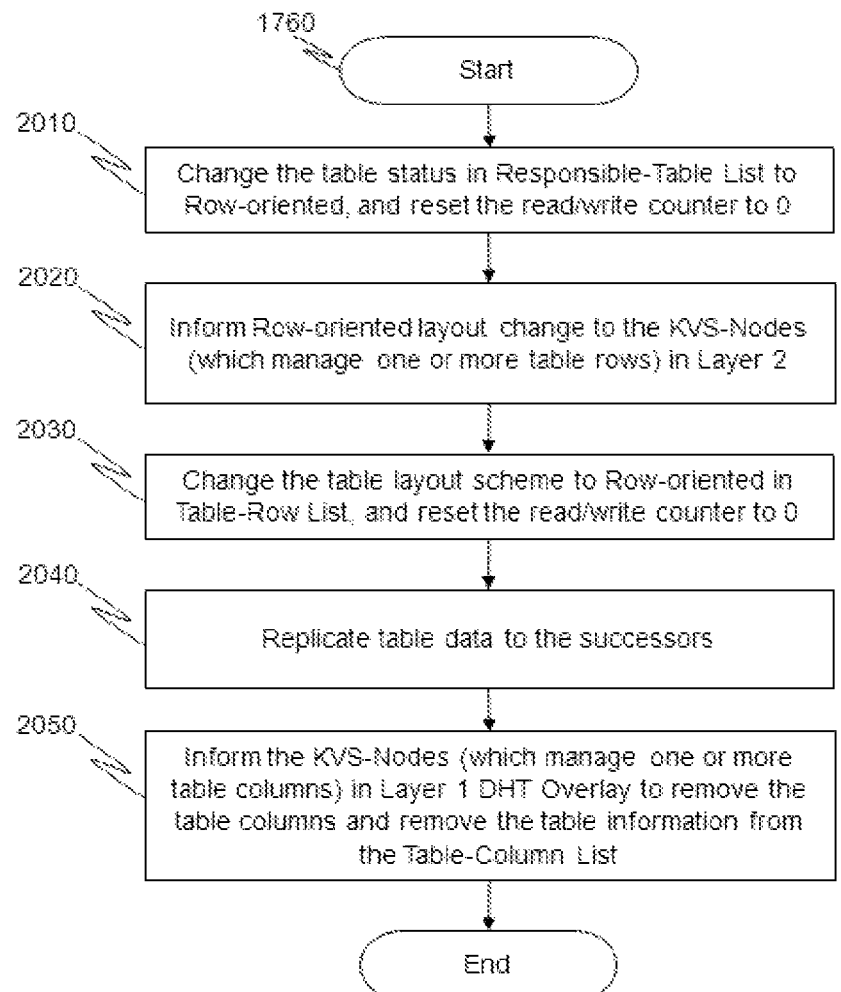
FIG. 20 is a flow diagram illustrating exemplary steps for changing a table layout to row-oriented (Step 1760).

FIG. 20 is a flow diagram illustrating exemplary steps constituting the Step 1760. In Step 2010, the KVS-Node 0110 (i.e., a table responsible node) changes the table layout scheme 1220 in responsible-table list 0242 to row-oriented, and resets the read and write counters 1250 and 1260 to 0. In Step 2020, the table responsible node informs the corresponding KVS-Nodes 0110 in Layer 2, which manage one or more table rows, of the row-oriented layout scheme change. In Step 2030, when receiving the information from the table responsible node, the corresponding KVS-Nodes change the table information in the table-row list 0244, i.e., change the table layout scheme 1320 to row-oriented and reset the read and write counters 1330 and 1340 to 0. In Step 2040, the corresponding KVS-Nodes replicate the table data to their successor nodes, and in Step 2050, the table responsible node informs KVS-Nodes 0110 in Layer 1, which now manage one or more table columns, to remove the table columns and remove the table information from the table-column list 0243.

Figure 21:
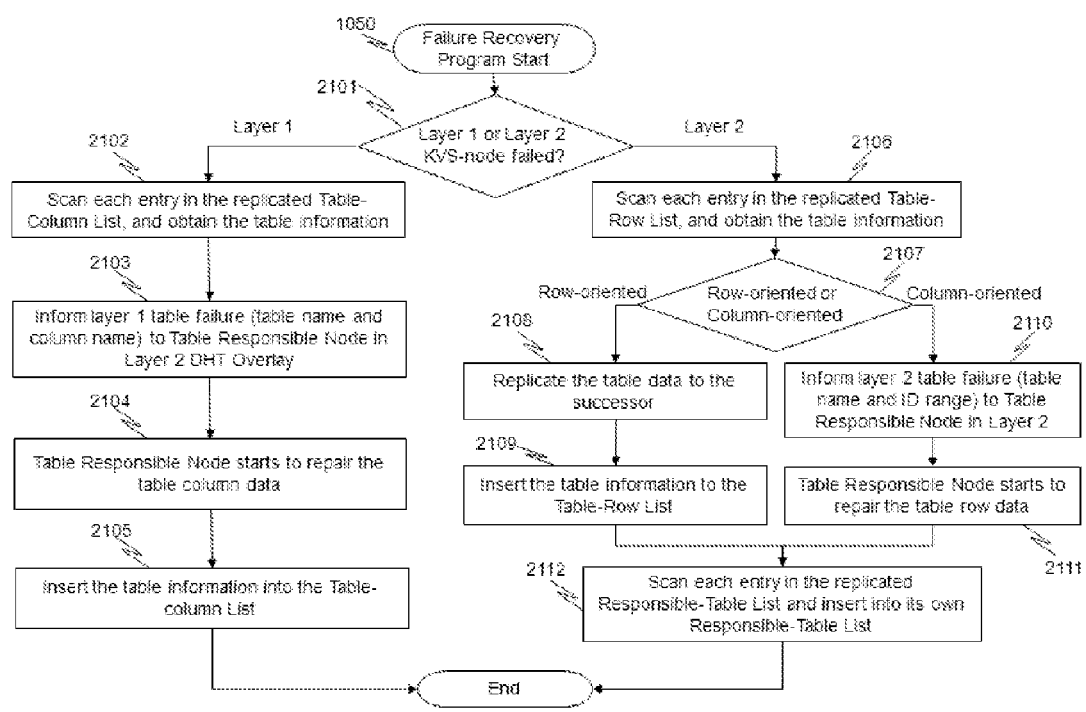
FIG. 21 is an example of a flow diagram of the Failure Recovery Phase (Step 1050).

When a KVS-Node 0110 detects a failure of its predecessor node (in Step 1030 or Step 1510), the KVS-Node will start the Failure Recovery Phase (Step 1050) by executing the failure recovery program 0266. FIG. 21 is an example of a flow diagram of the Failure Recovery Phase 1050. In Step 2101, the KVS-Node checks whether the failure occurred in Layer 1 or Layer 2. If the failure occurred in Layer 1, the KVS-Node scans each entry in the replicated table-column list 0243 (a replica of the table-column list for the failed KVS-Node), and obtains the table information (Step 2102). In Step 2103, the KVS-Node informs the table responsible node in Layer 2 of the table failure, including table name and column name. Thereafter, in Step 2104, the table responsible node will start to repair the table column data. In Step 2105, the KVS-Node inserts the table information into its own table-column list 0243.

Figure 22:
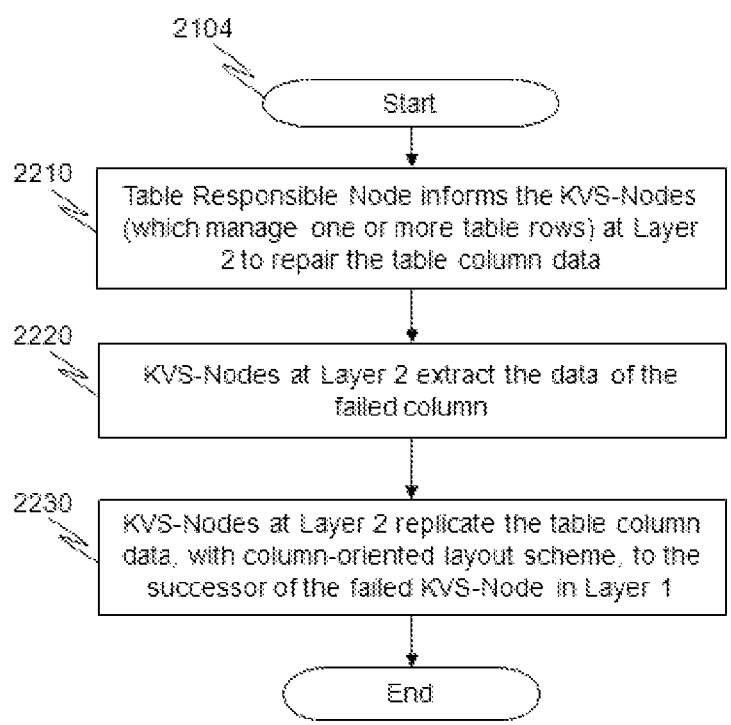
FIG. 22 is a flow diagram illustrating exemplary steps performed by a table responsible node to repair table column data (Step 2104).

FIG. 22 is a flow diagram illustrating exemplary steps constituting the Step 2104. In Step 2210, the table responsible node first informs the corresponding KVS-Nodes 0110 at Layer 2, which manage one or more table rows, to repair the table column data. In Step 2220, the corresponding KVS-Nodes extract the data of the failed column from the Key-Value table 0241. In Step 2230, the corresponding KVS-Nodes replicate the table column data, with a column-oriented layout scheme, to the successor node of the failed KVS-Node in Layer 1.

Figure 23:
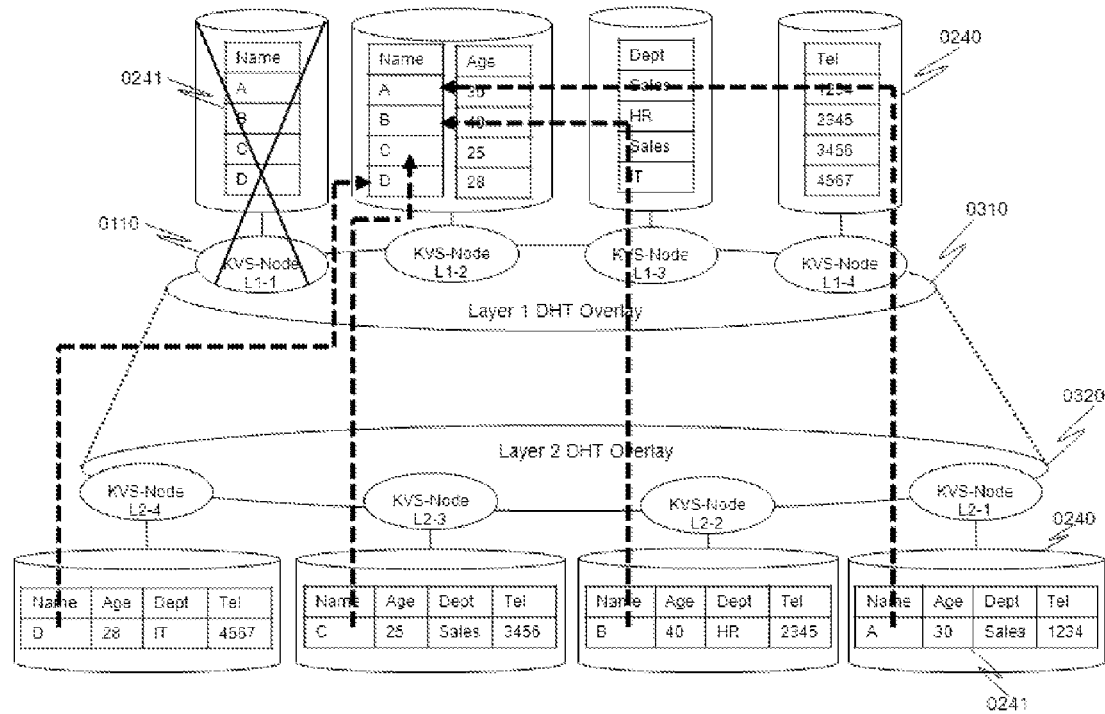
FIG. 23 shows an example illustrating a failed KVS-Node in the Layer 1 DHT overlay, and repair of table column data of column "Name" from the KVS-Nodes in the Layer 2 DHT overlay.

FIG. 23 shows an example illustrating a failed KVS-Node (L1-1) in Layer 1. Table column data of the "Name" column is repaired from the KVS-Nodes in Layer 2, each of which manages one table row, to the successor node (L1-2) of the failed KVS-Node, as shown by dashed arrows.

Referring back to FIG. 21, if the failure occurred in Layer 2, the KVS-Node scans each entry in the replicated table-row list 0244 (a replica of the table-row list for the failed KVS-Node), and obtains the table information (Step 2106). In Step 2107, the KVS-Node checks whether the table layout scheme 1320 is row-oriented or column-oriented. If the table layout scheme is row-oriented, the KVS-Node replicates the table data (replica of the table rows for the failed KVS-Node) to its successor node (Step 2108). In Step 2109, the KVS-Node inserts the table information into its own table-row list 0244.

If the table layout scheme is column-oriented in Step 2107, the KVS-Node informs the table responsible node in Layer 2 of the table failure, including table name and ID range managed by the failed KVS-Node (Step 2110). Thereafter, in Step 2111, the table responsible node will start to repair the table row data. In Step 2112, the KVS-Node scans each entry in the replicated responsible-table list 0242 (replica of the responsible-table list for the failed KVS-Node), and inserts the table information into its own responsible-table list 0242.

Figure 24:
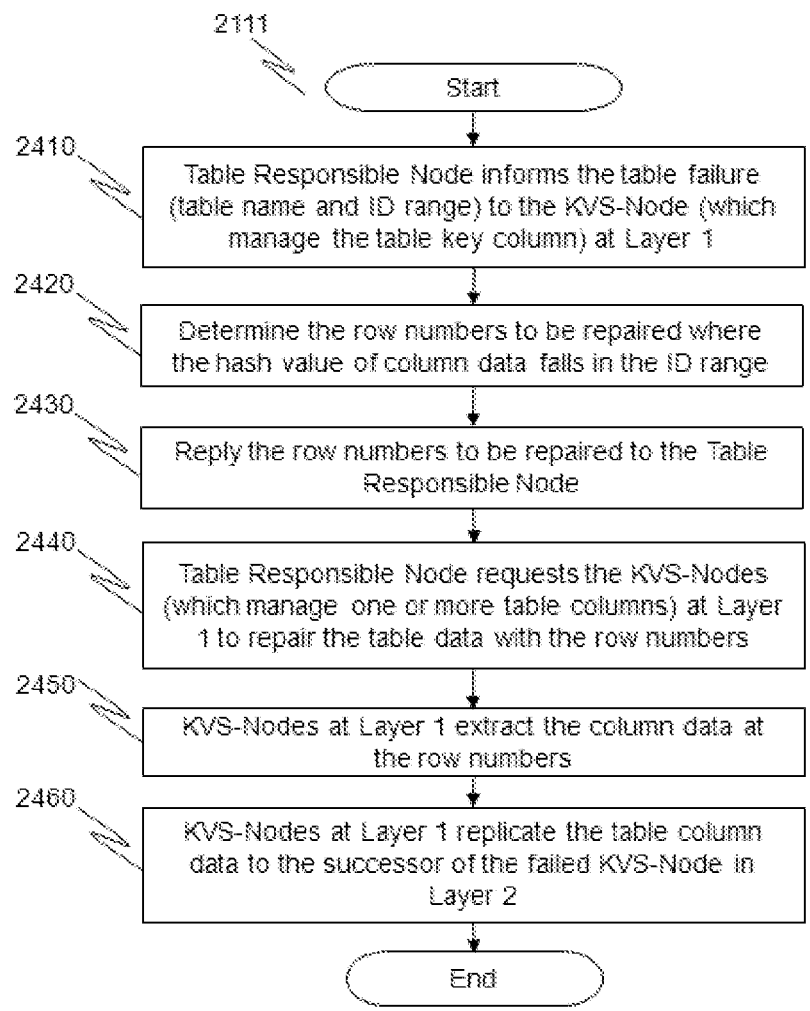
FIG. 24 is a flow diagram illustrating exemplary steps performed by a table responsible node to repair table row data (Step 2111).

FIG. 24 is a flow diagram illustrating exemplary steps constituting the Step 2111. In Step 2410, the table responsible node first informs the KVS-Nodes 0110 at Layer 1, which manage the key column of the table, of the table failure (including table name and ID range). In Step 2420, the corresponding KVS-Node at Layer 1 then determines the row numbers to be repaired where the hash value of the column data falls in the ID range. In Step 2430, the corresponding KVS-Node at Layer 1 replies to the table responsible node with the row numbers to be repaired. In Step 2440, the table responsible node requests the KVS-Nodes at Layer 1, which manage one or more table columns, to repair the table data with the row numbers. In Step 2450, the KVS-Nodes at Layer 1 extract the column data at the row numbers. In Step 2460, the KVS-Nodes at Layer 1 replicate the column data to the successor node of the failed KVS-Node at Layer 2.

Figure 25:
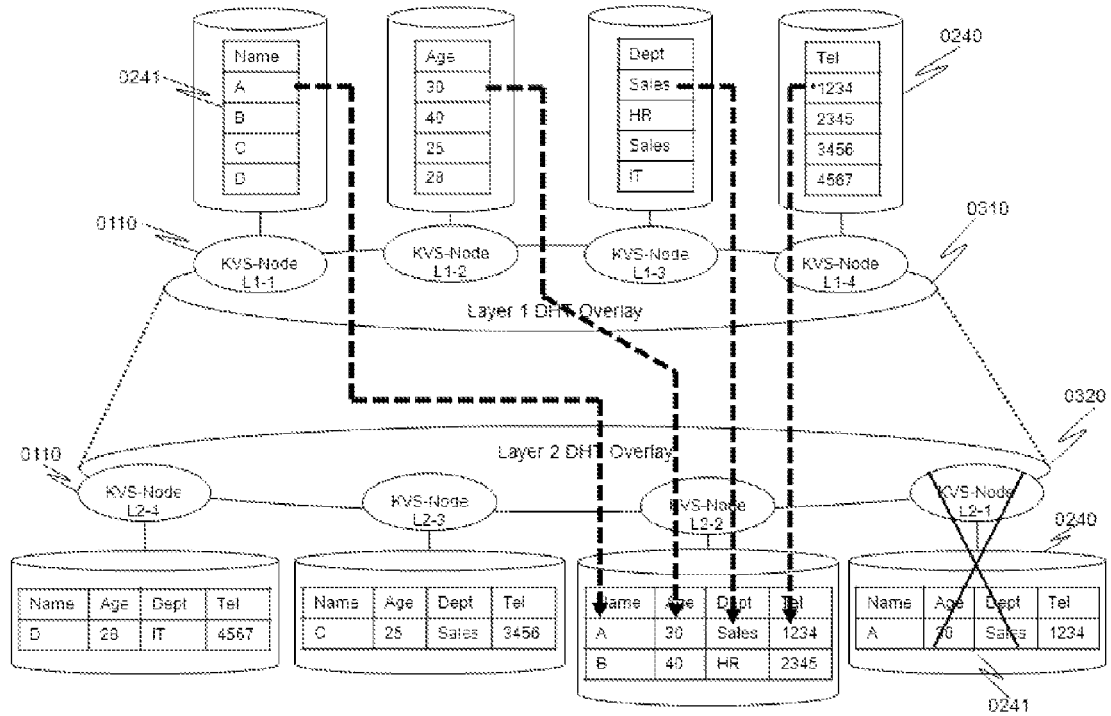
FIG. 25 shows an example illustrating a failed KVS-Node in the Layer 2 DHT overlay, and repair of table row data from the KVS-Nodes in the Layer 1 DHT overlay.

FIG. 25 shows an example illustrating a failed KVS-Node (L2-1) in Layer 2. Table row data is repaired from the KVS-Nodes in Layer 1, each of which manages one table column, to the successor node (L2-2) of the failed KVS-Node, as shown by dashed arrows.

Figure 26:
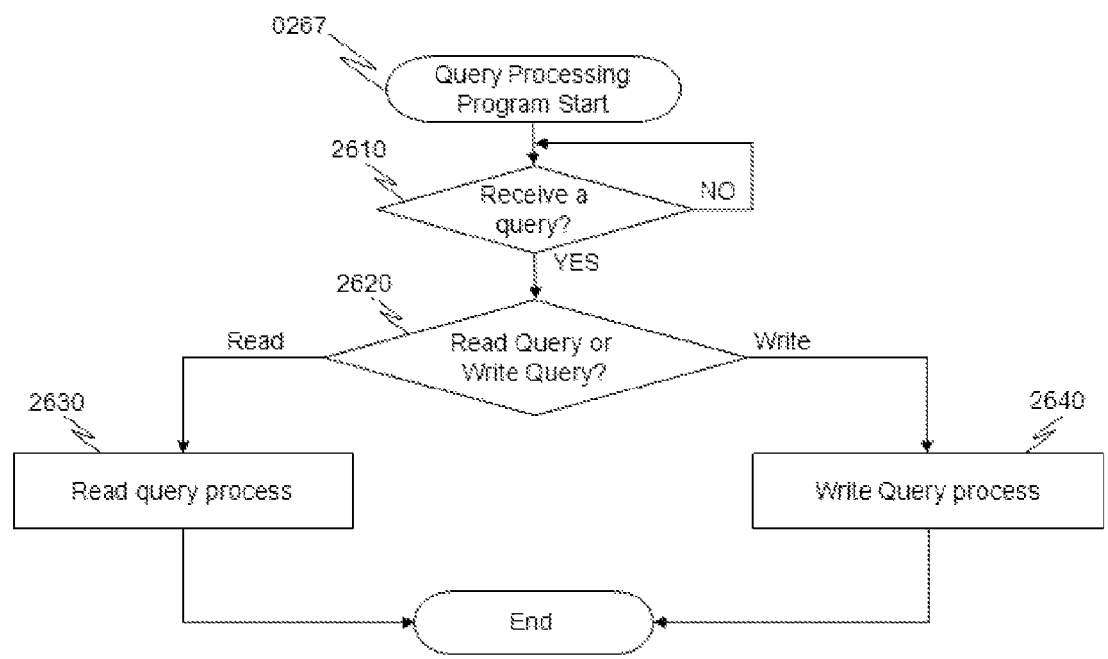
FIG. 26 is a flow diagram illustrating exemplary steps of the query processing program.

Once the system is constructed as aforementioned, the KVS-Nodes 0110 cooperatively serve user queries, by executing the query processing program 0267. FIG. 26 is a flow diagram illustrating exemplary steps of the query processing program 0267. In Step 2610, a KVS-Node 0110 checks whether any user query has been received. If YES, the KVS-Node checks whether the query is a read query or write query (Step 2620). If it is a read query, the read query process is invoked in Step 2630. If it is a write query, the write query process is invoked in Step 2640.

Figure 27:
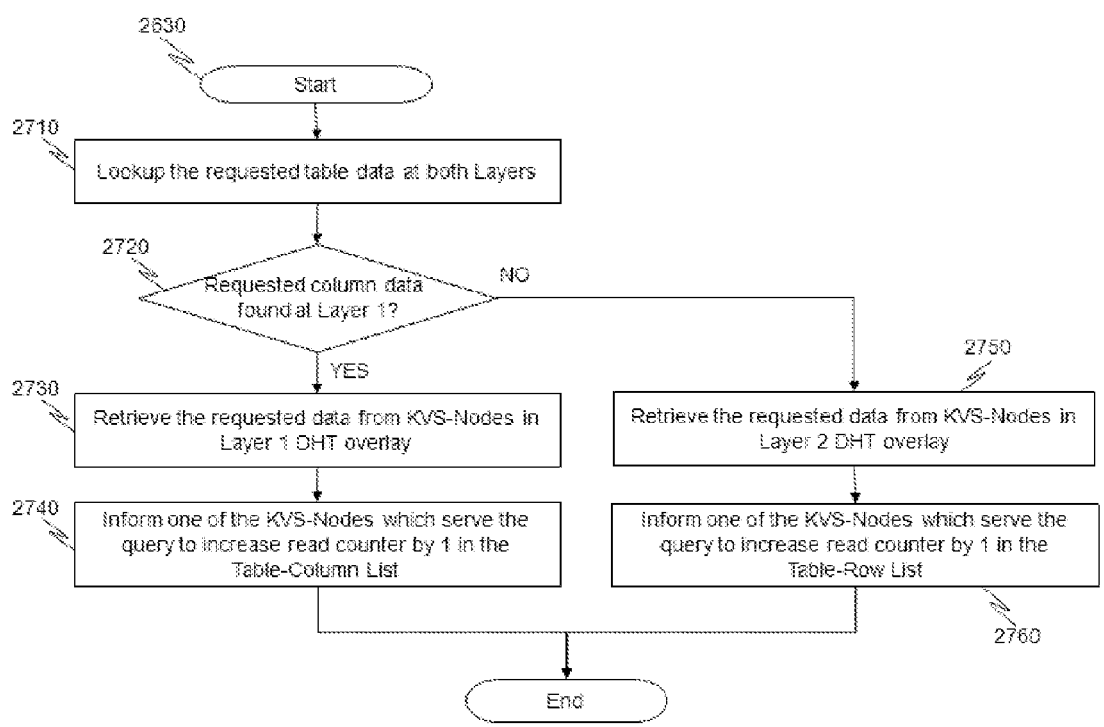
FIG. 27 is a flow diagram illustrating the read query process (Step 2630).

FIG. 27 is a flow diagram illustrating the read query process (Step 2630). In Step 2710, the KVS-Node 0110 looks up the requested table data at both Layer 1 and Layer 2. In Step 2720, the KVS-Node checks whether the requested column data are found at Layer 1. If YES, the KVS-Node retrieves the requested table data from the KVS-Nodes in Layer 1, which manage the requested column data (Step 2730). In Step 2740, the KVS-Node informs one of the KVS-Nodes which serve the query to increase the read counter 1630 in the table-column list 0243. If NO in Step 2720, the KVS-Node retrieves the requested table data from the KVS-Nodes in Layer 2 (Step 2750). In Step 2760, the KVS-Node informs one of the KVS-Nodes which serve the query to increase the read counter 1330 in the table-row list 0244.

Figures 28, 29:
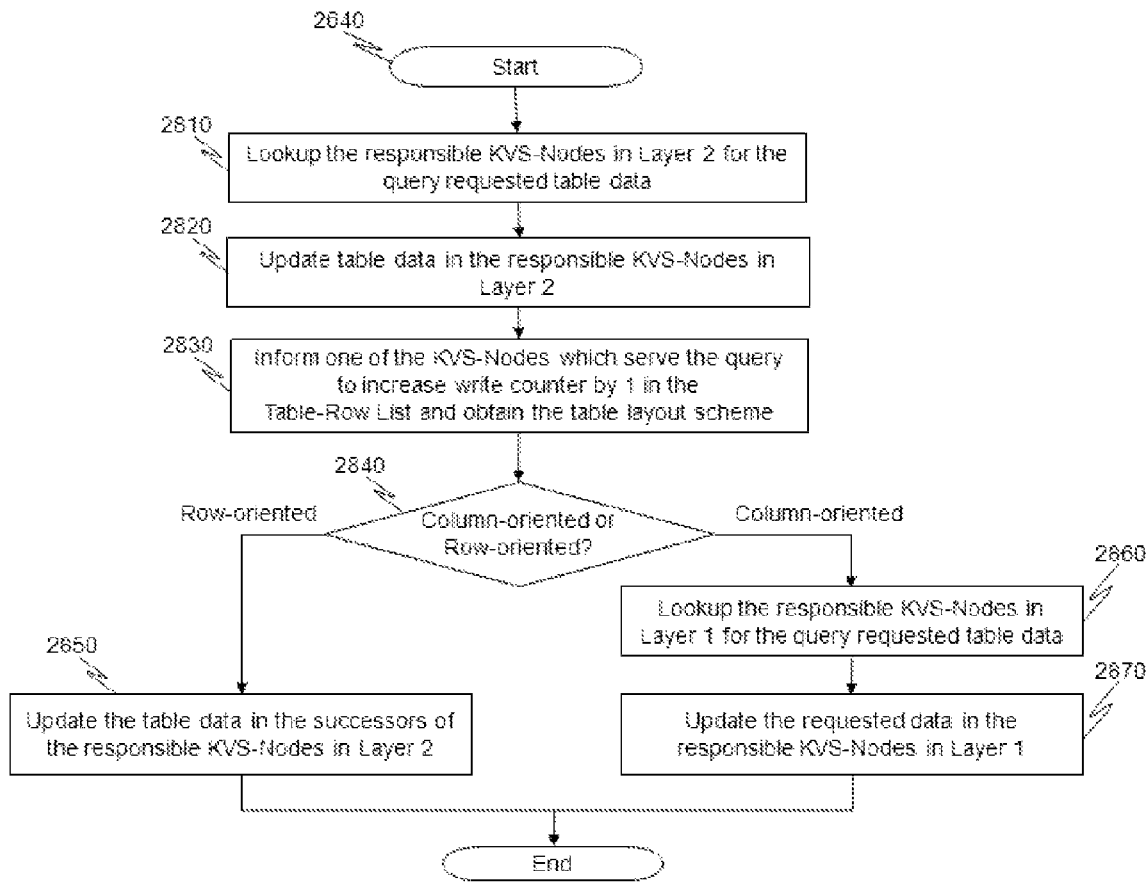
FIG. 28 is a flow diagram illustrating the write query process (Step 2640).
FIG. 29 shows a table-row list to which a "Status" column has been added to indicate whether the table data contained therein need to be transferred from the current DHT overlay to another to implement a change in table layout scheme.

FIG. 28 is a flow diagram illustrating the write query process (Step 2640). In Step 2810, the KVS-Node 0110 looks up the responsible KVS-Nodes in Layer 2 for the requested table data. In Step 2820, the KVS-Node updates the table data in the responsible KVS-Nodes in Layer 2. In Step 2830, the KVS-Node informs one of the responsible KVS-Nodes which serve the query to increase write counter 1340 in the table-row list 0244, and obtain the table layout scheme 1320. In Step 2840, the KVS-Node checks whether the table layout scheme is column-oriented or row-oriented. If it is row-oriented, the KVS-Node informs the responsible KVS-Nodes in Layer 2 to update the table data in their successor nodes (Step 2850). If it is column-oriented, the KVS-Node looks up the responsible KVS-Nodes in Layer 1 for the requested table data (Step 2860). In Step 2870, the KVS-Node updates the table data in the responsible KVS-Nodes in Layer 1.

Embodiment 2

A second embodiment of the present invention will be described next. The explanation will mainly focus on differences from the first embodiment.

In the first embodiment, during the Layout Optimization Phase 1040, if a table responsible node decides to change the table layout scheme, the entire table data need to be transferred immediately between Layer 1 and Layer 2. When the table data are large in size, this may cause a sudden burst of system resource utilization, such as of the CPU, disk I/O, and network bandwidth.

Therefore, in the second embodiment, when a table layout scheme needs to be changed, the table is marked as having "migrating" status, instead of transferring the data immediately between Layer 1 and Layer 2. On receiving a user query to access the table data, the requested table data are then transferred.

Figures 30, 31:
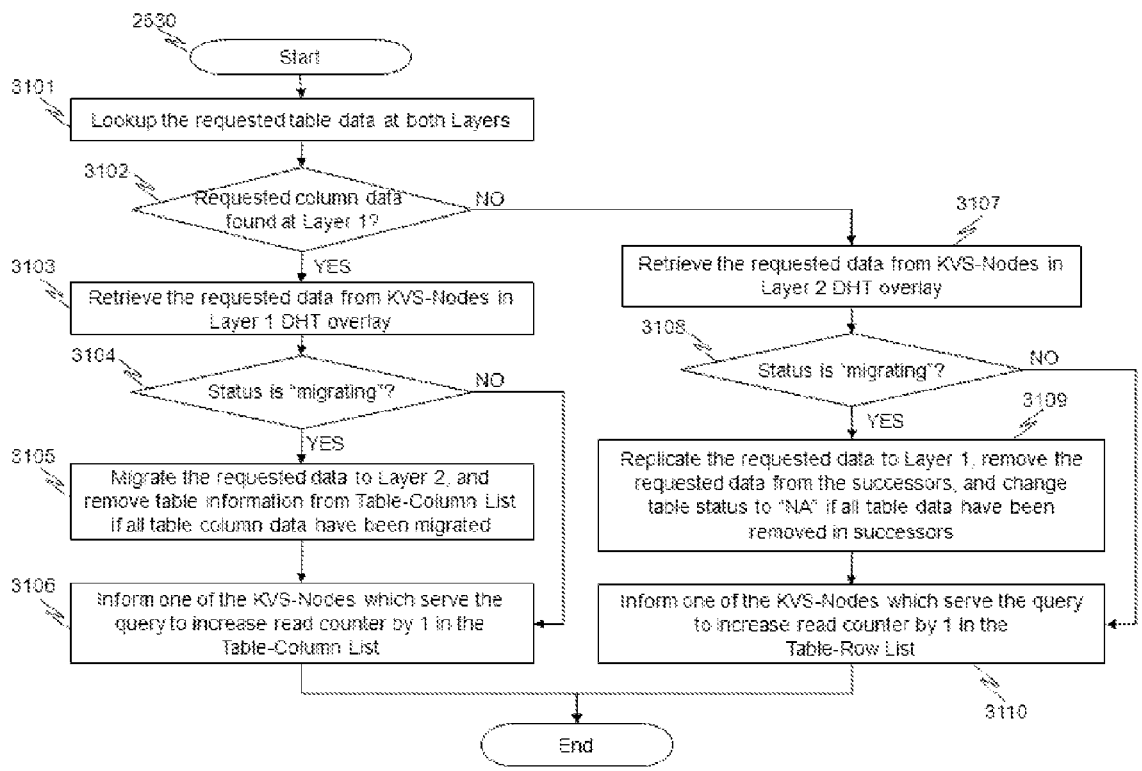
FIG. 30 shows a table-column list to which a "Status" column has been added to indicate whether the table data contained therein need to be transferred from the current DHT overlay to another to implement a change in table layout scheme.
FIG. 31 is a flow diagram illustrating exemplary steps of the read request process 2630 at a KVS-Node.

To this end, for both the table-row list 0244 and table-column list 0243, a status column is added as shown in FIG. 29 and FIG. 30. As shown in these figures, the status (2950 and 3050) is either "migrating" or "NA". A "migrating" status means that the table data need to be migrated from the current DHT overlay (0310 or 0320) to another. A "NA" status means that no migration is required for the table data. During the Layout Optimization Phase 1040, to change a table layout to column-oriented (Step 1740), instead of Steps 1840 and 1850, the corresponding KVS-Nodes 0110 at Layer 2, which manage one or more table rows, change the table status 2950 to "migrating". Similarly, to change a table layout to row-oriented (Step 1760), instead of Steps 2040 and 2050, the corresponding KVS-Nodes 0110 at Layer 1, which manage one or more table columns, change the table status 3050 to "migrating".

FIG. 31 is a flow diagram illustrating exemplary steps of the read request process 2630 at a KVS-Node 0110, according to the second embodiment. In Step 3101, the KVS-Node 0110 looks up the requested table data at both Layer 1 and Layer 2. In Step 3102, the KVS-Node checks whether the requested column data is found at Layer 1. If YES, the KVS-Node retrieves the requested table data from the KVS-Nodes in Layer 1, which manage the requested column data (Step 3103). In Step 3104, each of the KVS-Nodes, which serve the user query, checks whether the table status is "migrating". If YES, the KVS-Node migrates the requested data to Layer 2, and removes the table information from table-column list 0243 if all the table column data have been migrated (Step 3105). In Step 3106, the KVS-Node informs one of the KVS-Nodes, which serve the query and have the table information in table-column list 0243, to increase the read counter 3030 in the table-column list 0243.

If NO in Step 3102, the KVS-Node retrieves the requested table data from the KVS-Nodes in Layer 2, which manage the requested table data (Step 3107). In Step 3108, each of the KVS-Nodes, which serve the user query, checks whether the table status is "migrating". If YES, the KVS-Node replicates the requested data to Layer 1, removes the requested data from its successor node, and changes table status 2950 in table-row list 0244 to "NA" if all the table data have been removed in its successor node (Step 3109). In Step 3110, the KVS-Node informs one of the KVS-Nodes which serve the query to increase the read counter 2930 in the table-column list 0244.

Figures 32, 33:
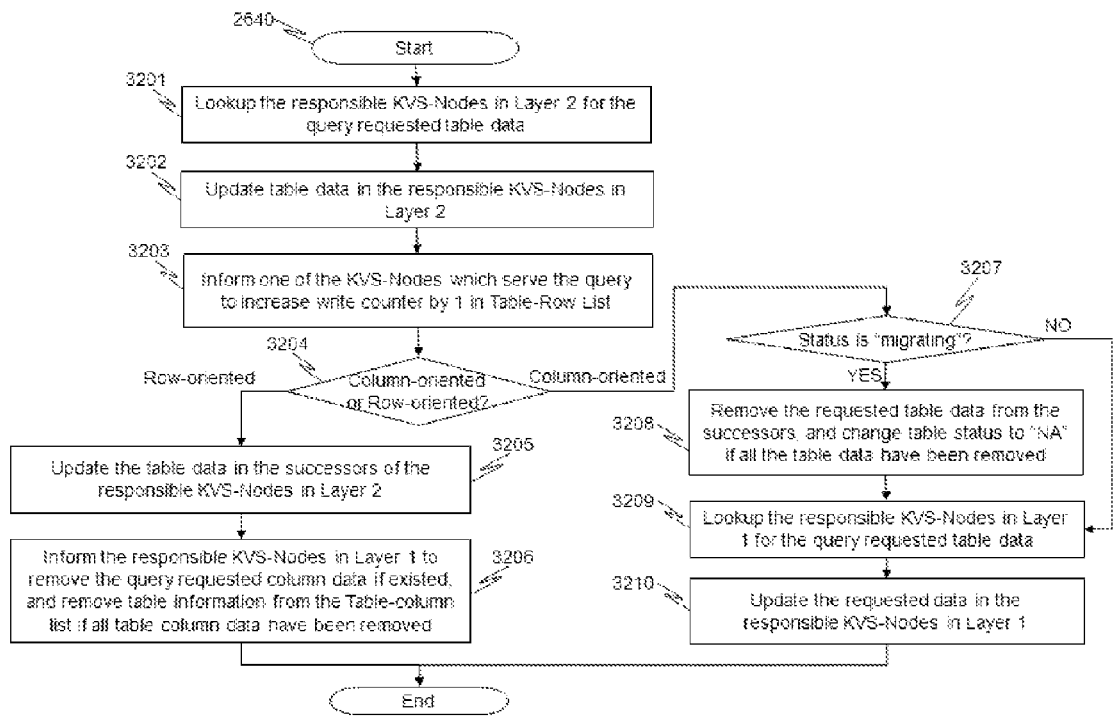
FIG. 32 is a flow diagram illustrating exemplary steps of the write request process 2640 at a KVS-Node.
FIG. 33 shows a KVS-Node Information Table stored at a workload responsible node, including a column holding a workload percentage number representing a resource utilization percentage for a KVS-Node.

FIG. 32 is a flow diagram illustrating exemplary steps of the write request process 2640 at a KVS-Node 0110, according to the second embodiment.

In Step 3201, the KVS-Node 0110 looks up the responsible KVS-Nodes in Layer 2 for the requested table data. In Step 3202, the KVS-Node updates the table data in the responsible KVS-Nodes in Layer 2. In Step 3203, the KVS-Node informs one of the responsible KVS-Nodes which serve the query to increase write counter 1340 in the table-row list 0244. In Step 3204, each of the KVS-Nodes, which serve the user query, checks whether the table layout scheme is column-oriented or row-oriented. If row-oriented, the KVS-Node will update the table data in its successor node (Step 3205), and in Step 3206, the KVS-Node informs the responsible KVS-Nodes in Layer 1 to remove the query requested column data if existing and to remove table information from the table-column list 0243 if all table column data have been removed. If column-oriented in Step 3204, the KVS-Node checks whether the table status 2950 in table-row list 0244 is "migrating" (Step 3207). If YES, the KVS-Node will remove the requested table data from its successor node, and change the table status 2950 to "NA" if all the table data have been removed from its successor node (Step 3208). In Step 3209, the KVS-Node 0110 looks up the responsible KVS-Nodes in Layer 1 for the requested table data. In Step 3210, the KVS-Node updates the table data in the responsible KVS-Nodes in Layer 1.

Therefore, according to the second embodiment, when the table layout scheme changes, the transfer of table data between the two DHT layers is spread out. Hence, the sudden burst of system resource utilization due to the optimization of the table layout scheme can be avoided.

Embodiment 3

A third embodiment of the present invention will be described in the following. The explanation will mainly focus on differences from the first and second embodiments.

In the first and second embodiments, a KVS-Node 0110 can belong only at the Layer 1 or Layer 2. However, when user access pattern changes and table data are transferred between DHT layers for layout scheme optimization, the number of KVS-Nodes 0110 at one layer may become more than required, whereas the KVS-Nodes 0110 at another layer may become overutilized. In this situation, it may be desirable to migrate a KVS-Node 0110 from one layer to another to balance the workload and improve system resource utilization.

As such, each DHT layer (0310 and 0320) maintains a KVS-Node Information Table stored at the table responsible node (referred to as the "workload responsible node"), as shown in FIG. 33. A KVS-Node Information Table 3300 consists of, but is not limited to, three columns, including Node ID 3310, IP Address 3320, and workload 3330. The Node ID 3310 is the hash value of a KVS-Node's IP Address 3320. Workload 3330 is a percentage number representing the resource (e.g., CPU, storage, Network bandwidth, or a combination thereof) utilization percentage for the KVS-Node. Each KVS-Node 0110 at a DHT overlay (0310 or 0320) periodically updates its workload to the workload responsible node.

Figure 34:
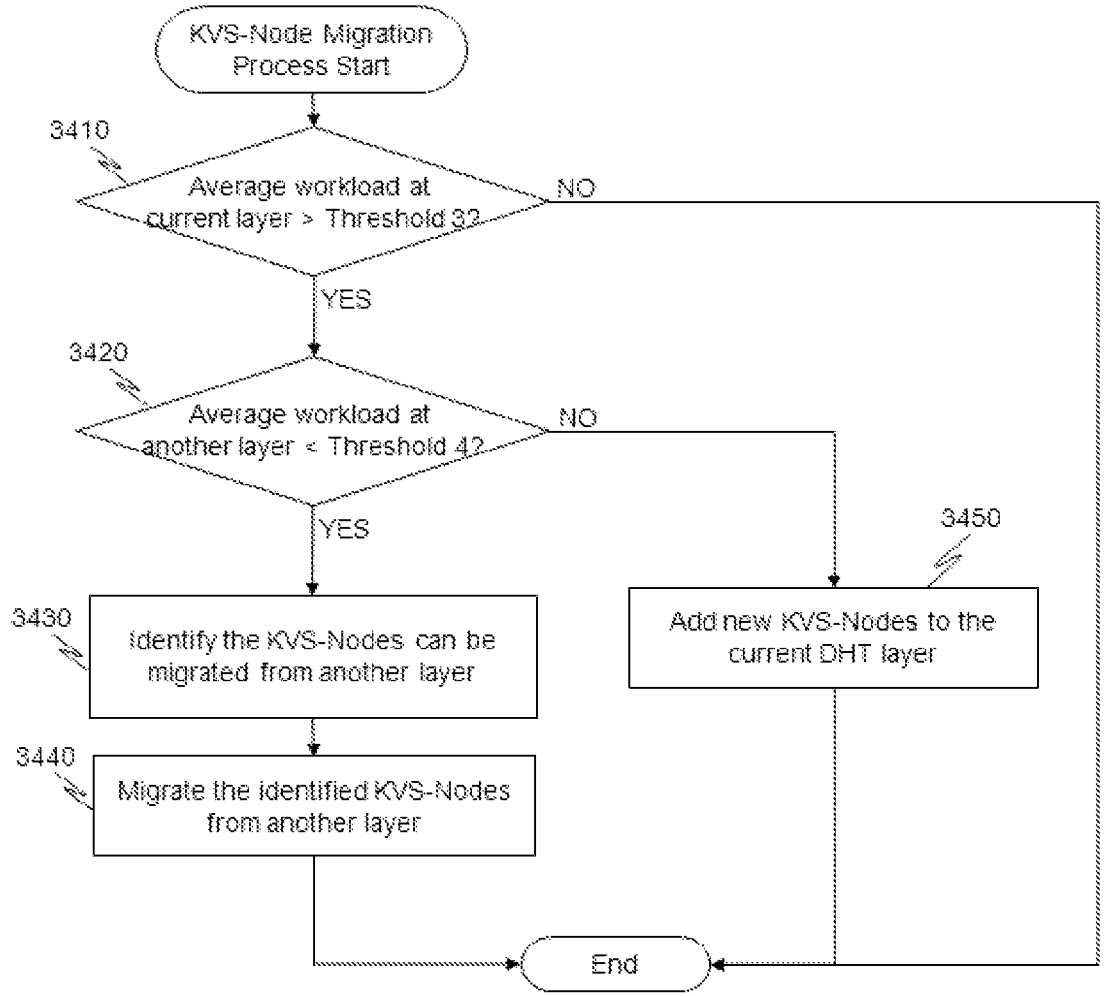
FIG. 34 shows a KVS-Node migration process.

The workload responsible node at each DHT layer periodically executes a KVS-Node migration process, as shown in FIG. 34, according to the third embodiment. In Step 3410, the workload responsible node checks whether the average workload 3330 of the KVS-Nodes 0110 at the current DHT layer (0310 or 0320), entered in the KVS-Node information table 3300, is greater than a predefined threshold, Threshold 3. If YES, the workload responsible node further checks whether the average workload of the KVS-Nodes at another DHT layer is smaller than a predefined threshold, Threshold 4 (Step 3420). If YES, the workload responsible node at the current DHT layer requests the workload responsible node at another DHT layer to identify the KVS-Nodes that can be migrated, such as KVS-Nodes having a smaller workload utilization 3330 (Step 3430). In Step 3440, the identified KVS-Nodes migrate from their DHT layers to the current DHT layer, i.e., leave another DHT layer and join the current DHT layer. It should be noted that after KVS-Node migration, the average workload in the other DHT overlay(s) should not be larger than Threshold 3. If NO in Step 3420, the workload responsible node will request to add new KVS-Nodes to the current DHT overlay to balance the workload (Step 3450).

Therefore, according to the third embodiment, KVS-Nodes 0110 can be migrated from one DHT layer to another. The utilization of the KVS-Nodes is improved and hence, fewer KVS-Nodes are required by the system.

We claim:

1. A distributed storage system comprising:
a plurality of Key-Value Store Nodes (KVS-Nodes) organized into two layers of a first layer and a second layer each forming a logical ring, in which a successor node of the plurality of KVS-Nodes succeeds a predecessor node of the plurality of KVS-Nodes in the logical ring in case of failure,
wherein each of the plurality of KVS-Nodes includes a processor, a network interface, a storage management module, and a storage interface, wherein the storage management module stores a first table in which data is stored in a column oriented layout scheme and distributed based on a hash value of column name in the first layer, or a second table in which data is stored in a row oriented layout scheme and distributed based on a hash value of row key in the second layer;
wherein a KVS-node changes table orientation layout scheme from a column oriented layout scheme to a row oriented layout scheme, or from a row oriented layout scheme to a column oriented layout scheme, based on user access pattern of read/write access to the table having the table orientation layout scheme being changed;
wherein the user access pattern is derived from user access history information relating to read accesses and write accesses to the table having the table orientation layout scheme being changed;
wherein the user access pattern is represented by a read/write ratio of a number of the read accesses to a number of the write accesses; and
wherein the KVS-node changes table orientation layout scheme from the row oriented layout scheme to the column oriented layout scheme if the read/write ratio is larger than a predefined first threshold, and from the column oriented layout scheme to the row oriented layout scheme if the read/write ratio is smaller than a predefined second threshold.

2. The distributed storage system according to claim 1,
wherein each of the plurality of KVS-Nodes checks if its predecessor node in the first layer or the second layer fails or not,
wherein if the predecessor node on the first layer or the second layer fails, the KVS-Node as the successor node recovers a failure of the predecessor,
wherein if the predecessor node in the first layer or the second layer does not fail, the KVS-Node as the successor node changes table orientation layout scheme from the column oriented layout scheme to the row oriented layout scheme, or from the row oriented layout scheme to the column oriented layout scheme, based on user access pattern.

3. The distributed storage system according to claim 1, wherein the first and the second layers form a logical ring ID space in which a first KVS-Node having a smallest ID succeeds a second KVS-Node having a largest ID in each layer.

4. The distributed storage system according to claim 1, wherein each of the plurality of KVS-Nodes creates at least one replication of data in the first or the second table to its successor node.

5. The distributed storage system according to claim 4, wherein at least one of the plurality of KVS-Nodes is a table responsible node in the second layer, which manages user access pattern sent from the plurality of KVS-Nodes.

6. The distributed storage system according to claim 5, wherein the table responsible node determines if the first table is required based on the user access pattern, and if the table responsible node so determines that the first table is required, the table responsible node informs the KVS-Nodes in the second layer to migrate the replications of data on the second table to its successor node in the first layer; and
wherein the table responsible node counts the number of read accesses and write accesses to the first table, determines the read/write ratio from the counted number of read accesses and write accesses, and executes the change of table orientation layout scheme from the second table to the first table if the read/write ratio determined from the counted number of read accesses and write accesses is greater than the first threshold.

7. The distributed storage system according to claim 6,
wherein the table responsible node comprises a read counter and a write counter configured to count the number of read accesses and write accesses, respectively, which comprise the read/write ratio; and
wherein the table responsible node resets the read and write counters in accordance with a change in a table orientation layout scheme.

8. The distributed storage system according to claim 1, wherein the values of the first threshold and the second threshold are based on table data size and system resources.

9. The distributed storage system according to claim 1, wherein the first threshold is greater than the second threshold.

* * * * *